(12) United States Patent
Nishikawa

(10) Patent No.: US 7,580,849 B2
(45) Date of Patent: Aug. 25, 2009

(54) PRODUCT SALES SUPPORT METHOD AND PRODUCT SALES SUPPORT APPARATUS

(75) Inventor: Akihito Nishikawa, Kanagawa-ken (JP)

(73) Assignee: Kabushiki Kaisha Toshiba (JP)

( * ) Notice: Subject to any disclaimer, the term of this patent is extended or adjusted under 35 U.S.C. 154(b) by 1340 days.

(21) Appl. No.: 10/426,552

(22) Filed: Apr. 30, 2003

(65) Prior Publication Data

US 2004/0015387 A1    Jan. 22, 2004

(30) Foreign Application Priority Data

Apr. 30, 2002    (JP) ............ P2002-129153

(51) Int. Cl.
G06F 17/50    (2006.01)
(52) U.S. Cl. ......................................... 705/7
(58) Field of Classification Search .............. 705/10, 705/26
See application file for complete search history.

(56) References Cited

U.S. PATENT DOCUMENTS

| | | | |
|---|---|---|---|
| 5,732,200 A | 3/1998 | Becker et al. | |
| 5,754,738 A | 5/1998 | Saucedo et al. | |
| 5,963,910 A | 10/1999 | Ulwick | |
| 6,687,560 B2 * | 2/2004 | Kiser et al. | 700/108 |
| 6,691,093 B2 * | 2/2004 | Shell | 705/26 |
| 7,191,143 B2 * | 3/2007 | Keli et al. | 705/10 |

FOREIGN PATENT DOCUMENTS

| | | |
|---|---|---|
| JP | 2001-014021 | 1/2001 |
| JP | 2001-209728 | 8/2001 |
| JP | 2001-338100 | 12/2001 |
| JP | 2002-092190 | 3/2002 |
| JP | 2002-108946 | 4/2002 |

OTHER PUBLICATIONS

Fung et al (An intelligent hybrid system for customer requirements analysis and product attribute targets), Dec. 1998, Int. J. Prod. Res., vol. 36, No. 1, pp. 1-22.*
Szymanski et al (Customer Satisfaction: A Meta-Analysis of the Empirical Evidence), Dec. 2001, Journal of the Academy of Marketing Science, vol. 29, No. 1, pp. 16-35.*
Krishnan (Customer Satisfaction for Financial Serivces: The Role of Products, Services, and Information Technology), Sep. 1999, Management Science, vol. 45, No. 9. pp. 1-17.*
Jay (Measuring the value added by technical documentation: a review of research and practice), Aug. 1998, Technical Communication, V45, n3, Dialog file 47 Accession No. 05229974, pp. 1-32.*
Bender, Graphical Presentation of RMF Host Performance Data with Programmable Workstation Based Spreadsheet Programs, IBM Technical Disclosure Bulletin, Sep. 1995, p. 125, vol. 38, No. 9.

* cited by examiner

Primary Examiner—Romain Jeanty
(74) Attorney, Agent, or Firm—Kilpatrick Stockton LLP

(57) ABSTRACT

A product sales supporting tool is provided where potential requirements for services accompanying product sales which will directly contribute to increased product sales, and systematic and easy formulation of product sales growth strategy are possible. This method comprises: generating required service characteristic information that shows user requirements for a service accompanying subject product offer, which are obtained from user preference data related to the service; prompting input of user evaluation data regarding each piece of generated required service characteristic information and user satisfaction level data regarding each piece of the required service characteristic information; outputting the input evaluation data and the input satisfaction level data in a visually recognizable manner on a display for each piece of the required service characteristic information; and outputting for display a quantitative metric importance level calculated for each respective quantitative metric, based on input of a correlation value between the required service characteristic information and a quantitative metric measuring the required service characteristic information.

18 Claims, 21 Drawing Sheets

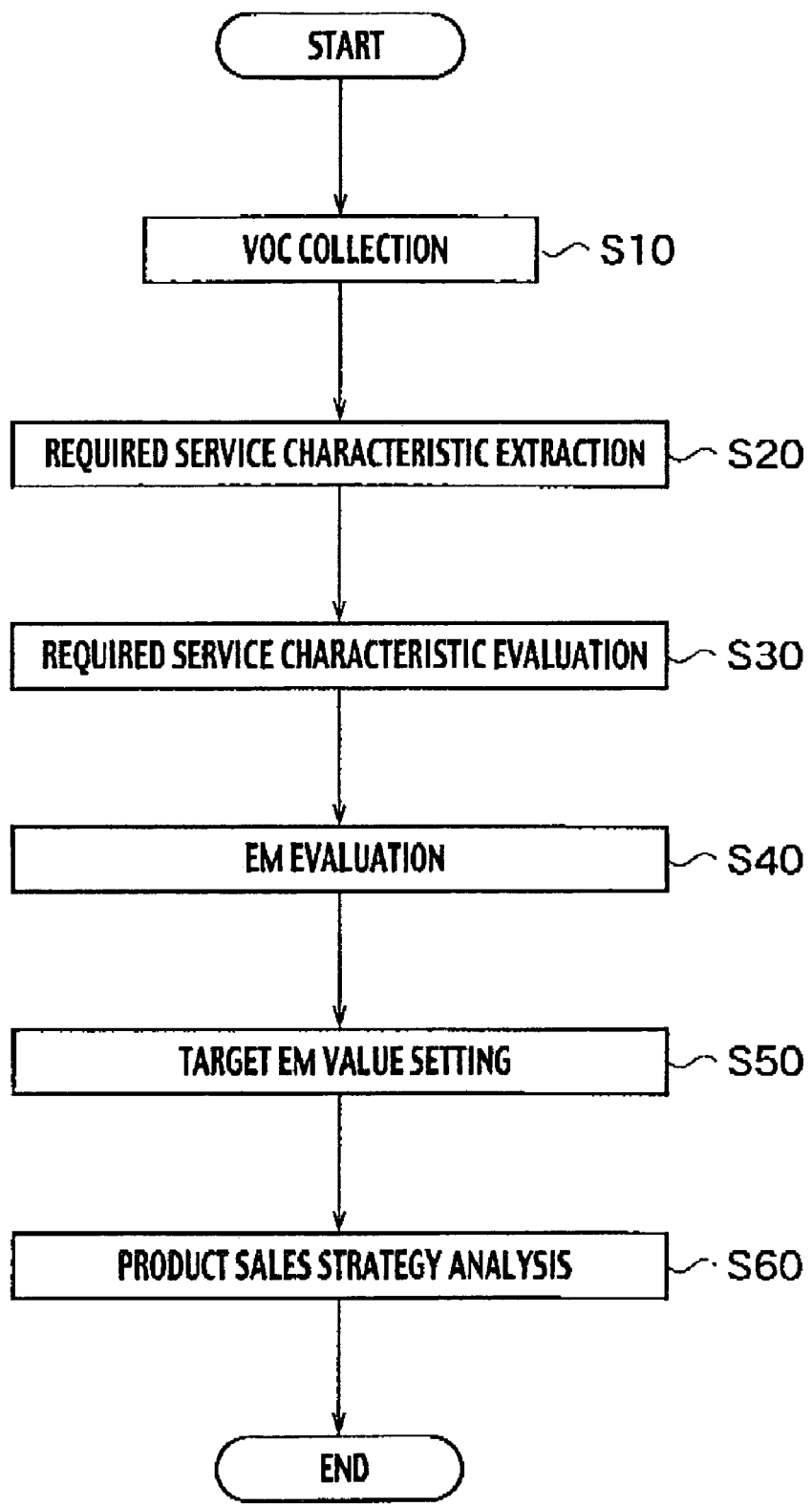

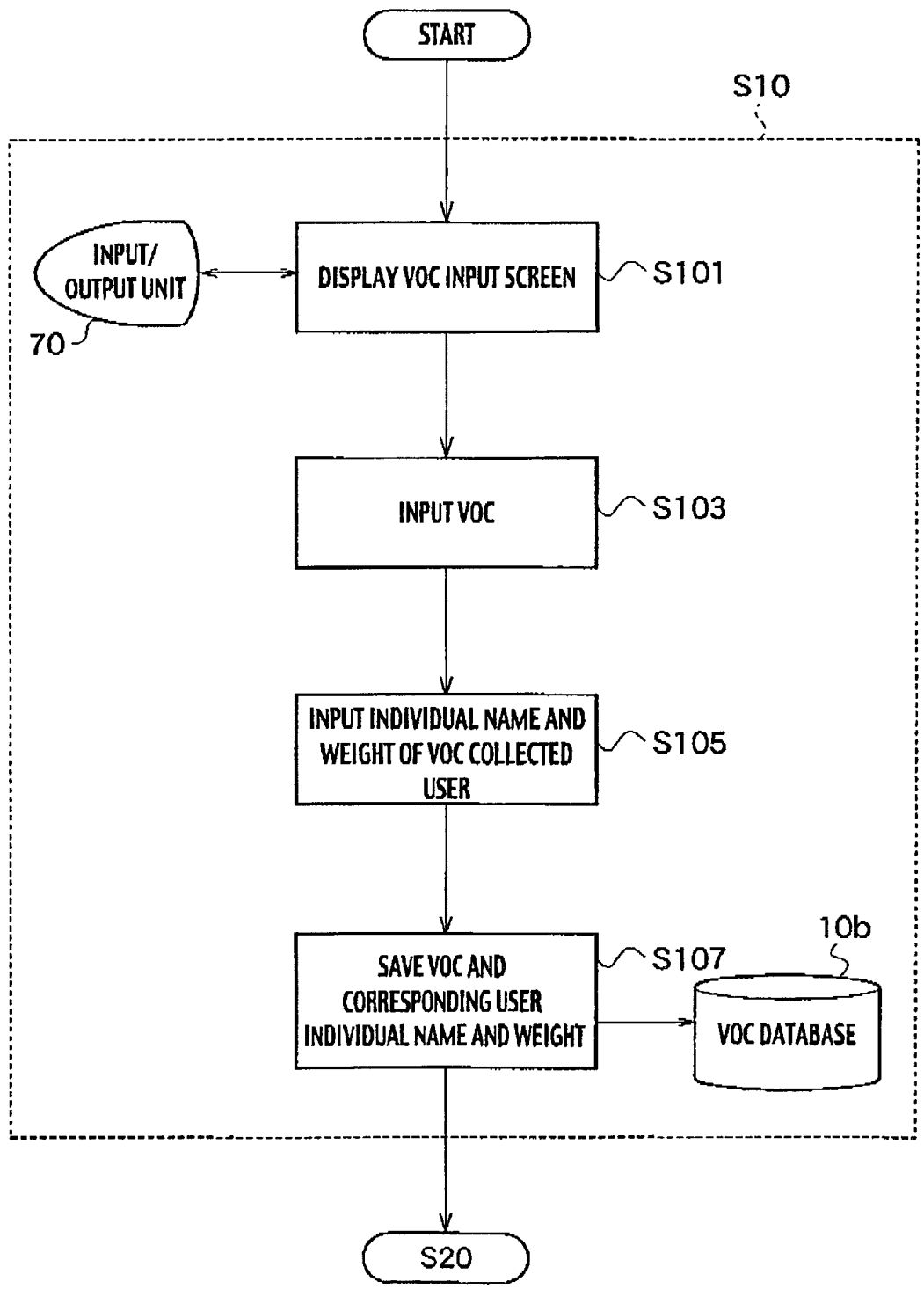

FIG. 4

| 1 (UNSORTED ITEMS) [0/15] | [1] (UNSORTED ITEMS):VOC (VOICE OF CUSTOMER) | REQUIRED ITEMS |
|---|---|---|
| TRASH CAN [0] | We want the price of the product to be lower. —41 | |
| 2 SELECT PRODUCT [1/1] | We want to receive specifications within one week of request. | |
| | We want samples to be brought right away. | |
| | Easy searching is important when selecting components. | |
| | In order to supplement a circuit that could not be brought into ASIC... | |
| | Can it be used when a bug is found to ... | |
| | When a component is searched, we want all of the products that match ... | |
| | Component selection is easier if specification is listed on the display... | |
| | Access speed and power consumption are less important. | |
| | We essentially do not use discrete logic for parts where speed is critical. | |
| | Even if search criteria are not perfectly matched, we want alternative... | |
| | We want shorter turn around time (TAT) between order and delivery. | |
| | How much does the sales staff know about the details of our products. | |
| | There are products that we want to discuss with the sales... | |
| | We want access to not only resources, but also to technical and planning staff... | |

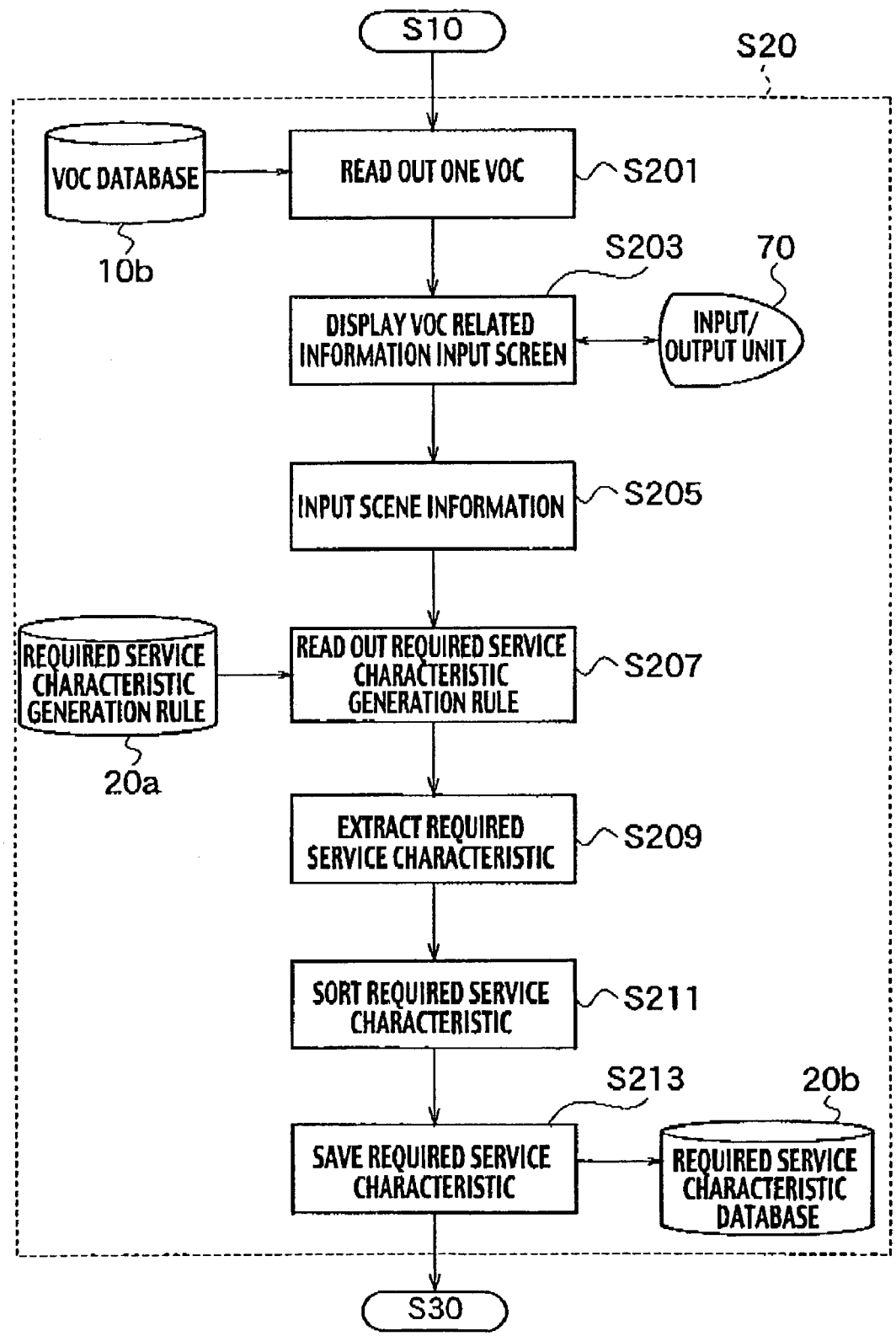

FIG. 7

| VOC(0) | WE ESSENTIALLY DO NOT USE DISCRETE LOGIC FOR PARTS WHERE SPEED IS CRITICAL |
|---|---|
| SCENE 1(1) | DESIGN TECH STAFF AT CUSTOMER FOUND A BUG DURING TRIAL PRODUCTION. CIRCUIT TO SOLVE THE PROBLEM WAS FOUND BUT WONDERING WHICH COMPONENT SHOULD BE USED. |
| SCENE 2(2) | DESIGN TECH STAFF AT CUSTOMER FOUND THAT COMPONENTS NOT IN THE ASIC LIBRARY WERE NEEDED DURING ASIC CIRCUIT DESIGN. |
| REQUIRED ITEM(3) | COMPONENT SELECTION CAN BE MADE IMMEDIATELY    ↑ PROPERTY(I) |
| REQUIRED SERVICE CHARACTERISTIC (4) | COMPONENT SELECTION IS EASY    ↑ PROPERTIES(I) |
|  | ↑ ADD(A)    ↑ REMOVE(R) |
| INPUT ITEM(5) |  |
| SELECTION MODE(6) | NEXT LEVEL ITEM CHOICE |
| INPUT CHOICE(7) | COMPONENT SELECTION CAN BE MADE IMMEDIATELY |
|  | CLOSE (C) |

71, 73

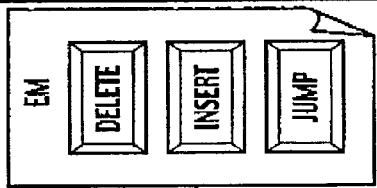
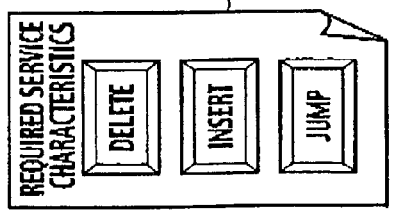
FIG. 11

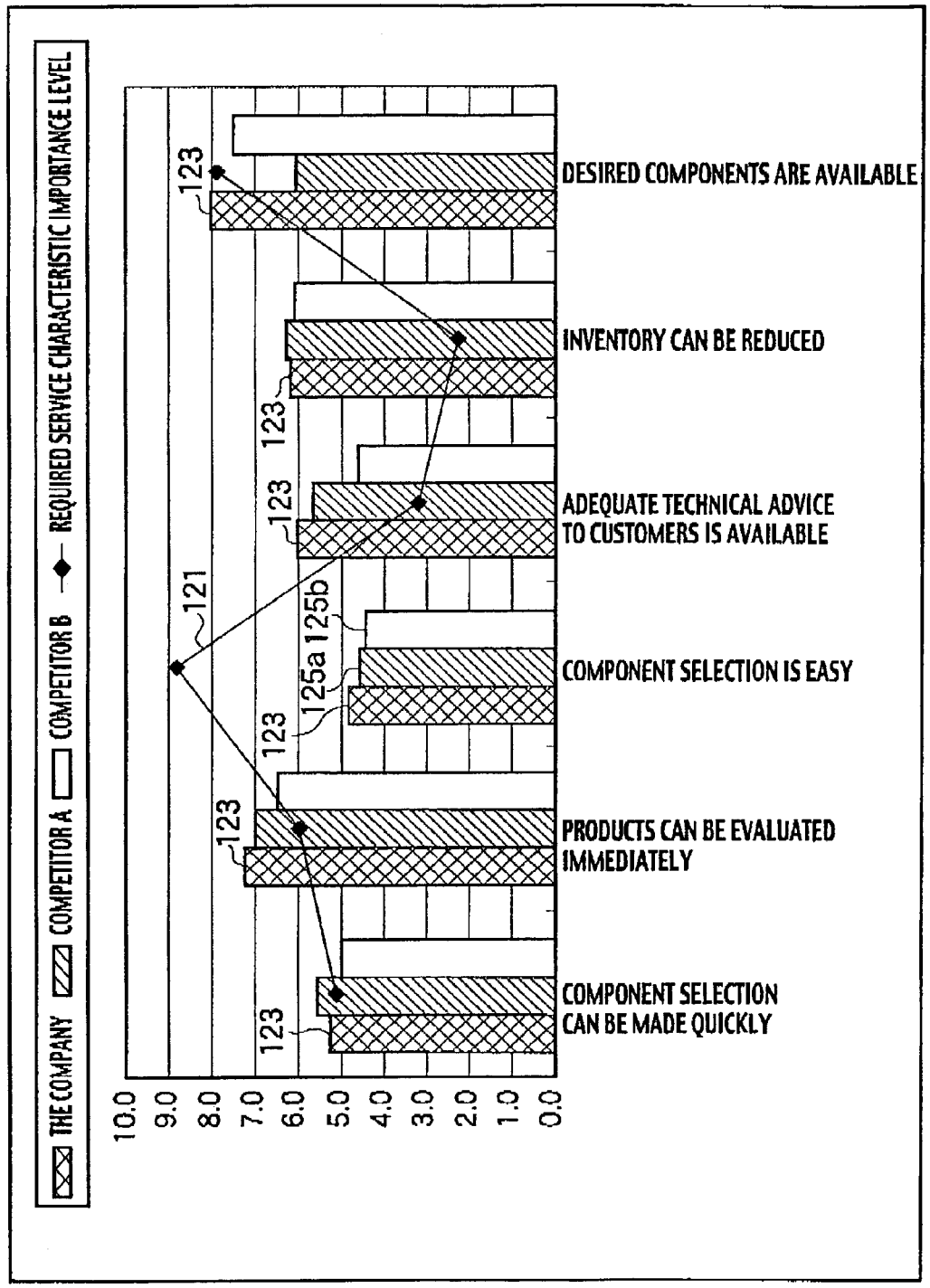

FIG. 13

| | | Component selection can be made quickly | Products can be evaluated immediately | Component selection is easy | Adequate technical advice to customers is available | Inventory can be reduced | Desired components are available |
|---|---|---|---|---|---|---|---|
| 137 | REQUIRED SERVICE CHARACTERISTICS WEIGHT | 14.5 | 16.3 | 37.9 | 6.7 | 4.8 | 19.9 |
| | ABSOLUTE WEIGHT | 6.9 | 7.8 | 18.1 | 3.2 | 2.3 | 9.5 |
| | WEIGHT | | | | | | |
| 135 | SALES POINT | 1.2 | 1.2 | 1.5 | 1.0 | 1.0 | 1.2 |
| 133 | RATE OF IMPROVEMENT (GRADED) | 1.1 | 1.1 | 1.4 | 1.0 | 1.0 | 1.0 |
| 131 | PLANNED QUALITY | 6.5 | 8.0 | 8.5 | 6.0 | 6.2 | 8.0 |
| | PLANNING | | | | | | |
| | COMPETITOR B | 5.0 | 6.5 | 4.4 | 4.5 | 6.1 | 7.5 |
| | COMPETITOR A | 5.5 | 7.0 | 4.5 | 5.7 | 6.3 | 6.1 |
| | THE COMPANY | 5.2 | 7.2 | 4.8 | 6.0 | 6.2 | 8.0 |
| | COMPARISON ANALYSIS (SATISFACTION LEVEL) 10 IS HIGHEST | | | | | | |
| | THE NUMBER OF TYPES PROVIDED | | ○ | | | | ● |
| | TAT BETWEEN ORDER AND DELIVERY [DAYS] | | | | ● | | |
| | AMOUNT OF TECHNICAL INFORMATION SUBMISSION | △ | △ | ● | | | |
| | TIME FOR SELECTING COMPONENTS [HOURS] | ○ | ○ | ● | | | |
| | TAT ON PROVIDING INFORMATION FOR VALUATION [DAYS] | ○ | ● | | | | |
| | TAT ON PROVIDING INFORMATION FOR COMPONENTS SELECTION [DAYS] | ● | △ | | | | |
| | REQUIRED SERVICE CHARACTERISTICS IMPORTANCE LEVEL | 5.1 | 6.0 | 8.8 | 3.2 | 2.3 | 7.9 |

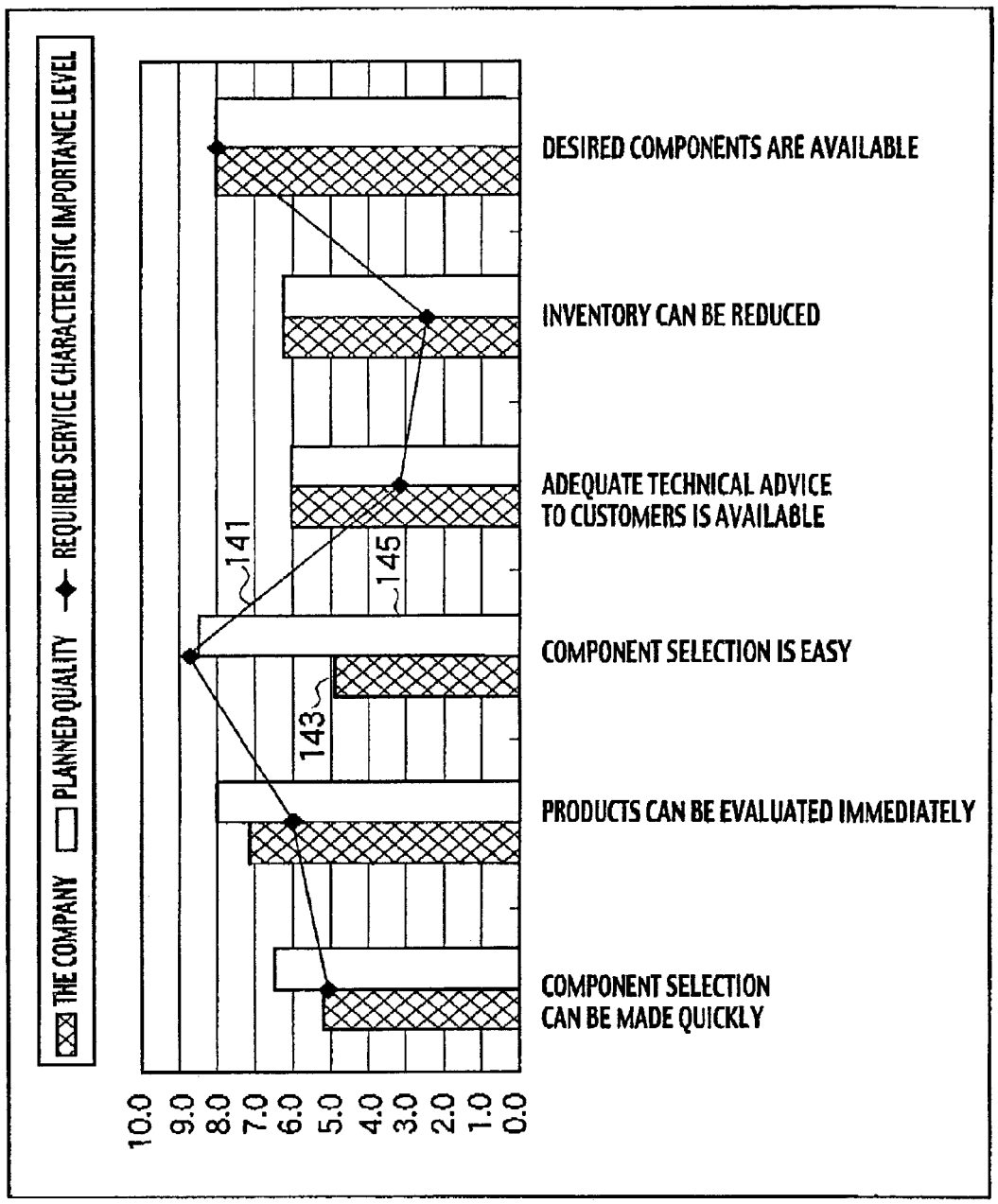

PRODUCT SALES SUPPORT METHOD AND PRODUCT SALES SUPPORT APPARATUS

CROSS-REFERENCE TO RELATED APPLICATIONS

This application is based upon and claims the benefit of priority from the prior Japanese Patent Application No. 2002-129153, filed on Apr. 30, 2002; the entire contents of which are incorporated herein by reference.

BACKGROUND OF THE INVENTION

1. Field of the Invention

The present invention relates to a product sales support method, a product sales support apparatus, and a product sales support program. In particular, it relates to a technique for implementing a product marketing strategy that has a high level of customer satisfaction, specifically a highly competitive product marketing strategy, by making planning decisions on services accompanying product sales variable for expanding sales of a product based on several preferences of the user for the services accompanying product sales.

2. Description of the Related Art

Generally, when formulating a sales growth strategy for expanding/increasing sales of a product, a sales staff member collects product preferences directly from customers or end users (hereinafter collectively called 'users') in the form of user meetings, interviews, or surveys (commonly referred to as Voice of Customer: VOC). This VOC is then manually analyzed by sales staff member to determine what services users want and what services should accompany the sales product in order to increase sales. The sales staff member or sales department formulates new strategies for product sales growth from the analysis results using their experience, intuition, and previous examples of successful contracts and applies these strategies to product marketing activities.

However, this conventional decision-making technique for product sales growth strategies has the following problems that should be solved.

Specifically, even if users' preferences about services accompanying product sales (hereinafter simply called 'services') can be understood from VOC collected from users, determination of what the overriding preferences are that should be incorporated into a product out of the plurality of preferences could only be made using sales staff member experience, intuition, and previous examples of successful contracts.

A situation may be considered where the following comments are gathered through VOC regarding for instance, a semiconductor-related product.

We want the price of the product to be lower.

We want to receive specifications within one week of request.

We want samples to be brought right away.

Easy searching is important when selecting components.

When a component is searched, we want a plurality of products listed that match the search criteria on the display screen.

Component selection is easier if each specification is also displayed in a list.

Access speed and power consumption is less important.

We essentially do not use discrete logic for parts where speed is critical.

Even if search criteria are not perfectly matched, we want alternative suggestions to be displayed if available.

We want shorter turn around time (TAT) between order and delivery.

How much does the sales staff know about the details of our product sets?

We want access to not only resources, but also to technical and planning staff.

We want a reel of samples.

You surely offer a complete line-up.

Although numerous VOC such as the above may be collected and demands of respective users understood from these VOC, there is no established procedure for systematic-ally analyzing which of these demands are decisive for product usage and what is the level of customer satisfaction (CS) compared with competitors to formulate product sales growth strategies.

As a result, (1) which demands are considered important are assumed based on the experience or intuition of a sales staff member or sales department at the discretion of each individual, and a product sales growth strategy is formulated to meet these assumed demands, however, in many cases this sales growth strategy was not effective.

In addition, (2) as described above, since there are no established product sales growth strategy formulation procedures, sales growth strategy formulation relies wholly upon the experience and intuition of experienced sales staff members. As a result, less experienced sales staff members were unable to formulate product sales growth strategies by collecting VOC required for product sales growth, evaluate the collected VOC, and then systematically analyze the results. Moreover, since sales growth strategy formulation for the product is wholly dependent on experienced sales staff members, it could not be performed on a systematic or organizational level, and effective cultivation of competent staff was difficult.

If new formulation of a sales growth strategy for the product is attempted based on an unsuccessful example where no contract was won, it was impossible to fully understand potential user requirements such as those that contribute to newly increased product sales from the above plurality of VOC, focus on this requirement, and lead it to a sales growth strategy. As a result, particularly in the unsuccessful example, there were many cases where the entire sales growth strategy ends up with reducing prices.

As described above, a product sales supporting tool has been desired where, without dependency on the sales staff member on experience or intuition, potential requirements for services accompanying product sales which will directly contribute to increased product sales based on VOC collection are selected, and systematic and easy formulation of product sales growth strategy are possible.

In addition, a product sales supporting tool has been also desired, in user requirement groups for service accompanying product obtained from VOC, to indicate the current status of the company and the competitor customer satisfaction levels and also to provide a function which allows quantitative and visual selection of requirements contributing to product sales growth where efforts should be focused.

SUMMARY OF THE INVENTION

An aspect of the present invention provides a method of product sales support, comprising: generating required service characteristic information that indicates user requirements for a service accompanying subject product offer, which are obtained from user preference data related to the service; storing the required service characteristic information in a storage device; prompting input of user evaluation data regarding each piece of generated required service characteristic information and user satisfaction level data regarding each piece of the required service characteristic information; outputting the input evaluation data and the input satisfaction level data in a list on a display device in a visually recognizable manner as required service characteristic evaluation information for each piece of the required service characteristic information; and outputting for display a quantitative metric importance level calculated for each respective quantitative metric, based on input of a correlation value between the required service characteristic information and the quantitative metric measuring the required service characteristic information.

An another aspect of the present invention provides a product sales support apparatus, comprising: a required service characteristic information generation unit configured to generate required service characteristic information that indicates user requirements for a service accompanying subject product offer, which are obtained from user preference data relating to the service, and store the required service characteristic information in a storage device; a required service characteristic information collection unit configured to prompt to input user evaluation data regarding each piece of generated required service characteristic information and user satisfaction level data regarding each piece of the required service characteristic information; a required service characteristic evaluation information output unit configured to output the input evaluation data and the input satisfaction level data in a list on a display device in a visually recognizable manner as required service characteristic evaluation information for each piece of the required service characteristic information; and a quantitative metric information output unit configured to output for display a quantitative metric importance level calculated for each respective quantitative metric, based on input of a correlation value between the required service characteristic information and the quantitative metric measuring the required service characteristic information.

An another aspect of the present invention provides a program, which causes a computer to execute a product sales support processing, comprising:

a required service characteristic information generation process, which generates required service characteristic information that indicates user requirements for a service accompanying subject product offer, which are obtained from user preference data related to the service, and stores the required service characteristic information in a storage device; a required service characteristic information collection process, which prompts input of user evaluation data regarding each piece of generated required service characteristic information and user satisfaction level data regarding each piece of said required service characteristic information; a required service characteristic evaluation information output process, which outputs the input evaluation data and the input satisfaction level data in a list on a display device in a visually recognizable manner as required service characteristic evaluation information for each piece of the required service characteristic information; and a quantitative metric information output process, which outputs for display a quantitative metric importance level calculated for each respective quantitative metric, based on input of a correlation value between the required service characteristic information and a quantitative metric measuring the required service characteristic information.

BRIEF DESCRIPTION OF THE DRAWINGS

FIG. 2 is a flowchart showing an abbreviated processing algorithm for the product sales support method according to the first embodiment of the present invention;

FIG. 3 is a flowchart showing detail of the processing in the VOC collection step (step S10) in FIG. 2;

FIG. 4 illustrates an example of a VOC input screen that has been input with VOC;

FIG. 5 is a flowchart showing detail of the processing in the required service characteristic extraction step (step S20) in FIG. 2;

FIG. 7 illustrates an example of an operation screen, which extracts required service characteristics from the VOC related information input screen in FIG. 6;

FIG. 11 illustrates an example of a required service characteristic evaluation information input screen displayed in step S303;

FIG. 12 illustrates an example of a graph image displayed in step S313;

FIG. 13 illustrates an example of a required service characteristic evaluation information input screen displayed in step S303;

FIG. 14 illustrates an example of a graph image displayed in step S315;

DETAILED DESCRIPTION OF THE INVENTION

Figure 1:
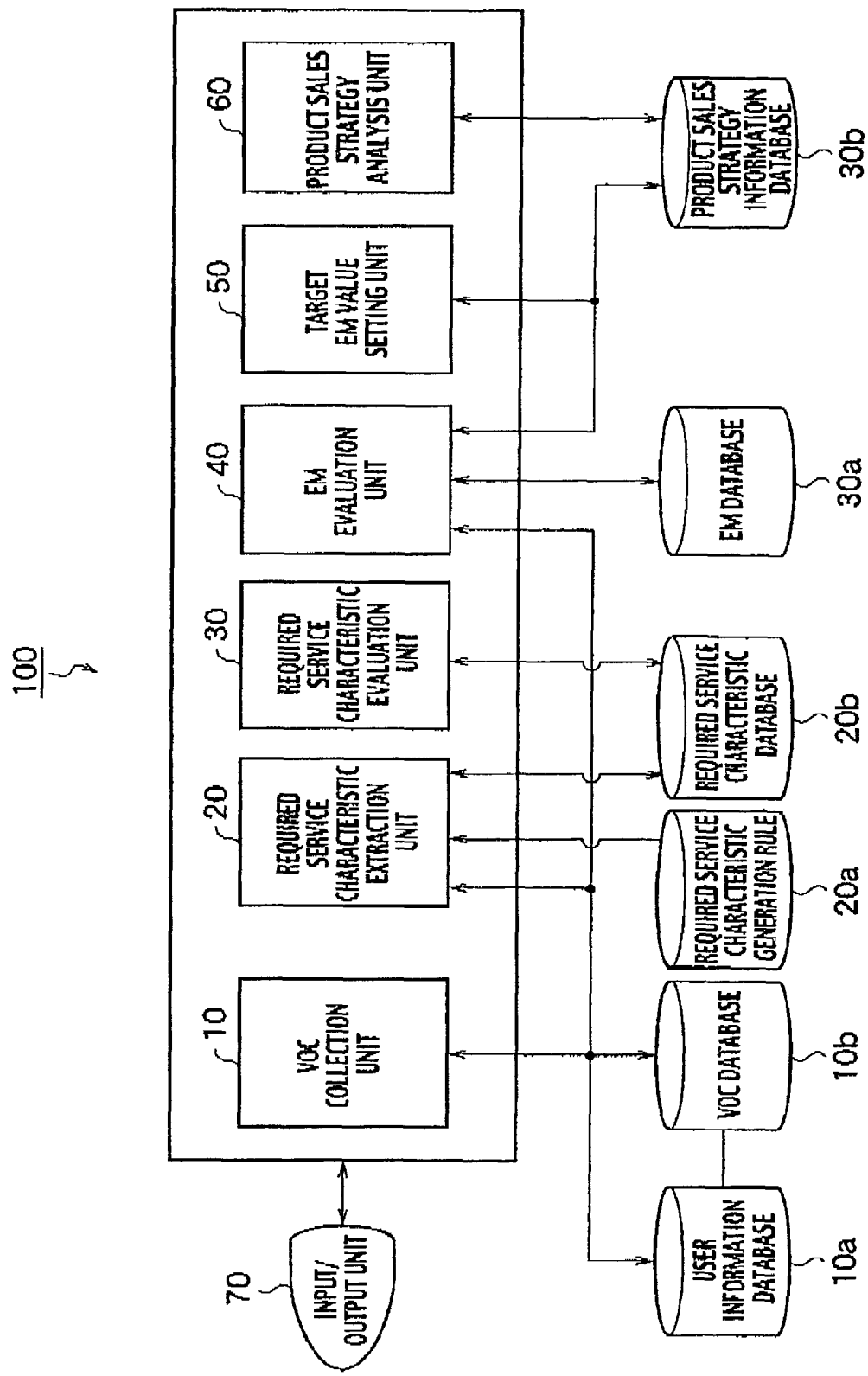
FIG. 1 is a block diagram illustrating the functional configuration of a product sales support apparatus according to a first embodiment of the present invention.

With this embodiment of the present invention, required service characteristics (customer requirements, hereafter referred to as 'CR') which indicate service characteristics required by the user regarding a subject product or subject product accompanying services are generated based on VOC about the subject product itself or the service accompanying subject product, and then importance levels or customer satisfaction levels for the respective CR in the generated CR group are output in a visually recognizable manner.

In addition, with this embodiments of the present invention, it becomes possible to quantitatively select CR which contribute more to subject product sales growth from the generated CR group and set measures (engineering metrics, hereafter referred to as 'EM') and specific target values for the EM in order to quantitatively evaluate the degree to which user preferences are being met.

In addition, with this embodiment of the present invention, it becomes possible to select a service to become the optimum sales growth strategy from a specific sales growth strategy group for reaching the specific EM target value.

(1) To begin with, at the of product sales growth planning stage, based on user VOC, a required service characteristic (Customer Requirement, hereinafter referred to as 'CR'), which is a requirement a user has indicated during interaction for the subject product itself or service to accompany the subject product is extracted and generated by referencing a required service characteristic database.

Next, survey results from users, in particular, users having decision-making authority regarding product purchase, are input to quantity level of importance and customer satisfaction for each required service characteristic and then output in a visibly recognizable format. This output is an indicator of current status in terms of product sales growth, and is a starting point for sales growth strategy formulation. By studying the output, an operator, for example a sales staff member, can quantitatively investigate in order beginning with the required service characteristic having the highest importance which required service characteristics should be focused on to obtain higher levels of customer satisfaction surpassing competitor companies and thus contribute to product sales growth.

(2) Next, at the product sales growth strategy formulation stage, based on the required service characteristics being focused on, the metrics for quantitatively evaluating the degree to which user service preferences have been met (also referred to as Engineering Metrics, hereinafter called 'EM') are evaluated. As these EM are all indices of measurable quantities, a specific EM target value can be set based on benchmarks with competitors. Specific sales growth strategy candidate groups for reaching this target EM value is presented by referencing a sales growth strategy database, and an optimum sales growth strategy is selected from these sales growth strategy candidate groups in consideration of how well costs and the target are met.

<Detailed Structure and Function of Embodiment of the Present Invention>

In the following, a product sales support method and product sales support device according to an embodiment of the present invention is described in detail while referencing FIGS. 1 through 21.

This embodiment determines potential requirements regarding services accompanying a product offer of a user to directly contribute to increased product sales based on VOC collection, and provides functions for systematic, easy determination of a product sales growth strategy capable of obtaining the highest level of customer satisfaction.

Furthermore, this embodiment uses user requirement groups obtained from VOC regarding services accompanying products to indicate to the operator the current status of their own and their competitors level of customer satisfaction and also to provide a function which allows quantitative and visual selection of requirements contributing to product sales growth where efforts should be focused.

FIG. 1 is a block diagram illustrating the functional configuration of a product sales support apparatus according to a first embodiment of the present invention.

It should be noted that in this specification, the product is a concept that includes both a tangible product and the intangible service itself.

As shown in FIG. 1, a product sales support apparatus 100 according to this embodiment comprises a VOC collection unit 10, a user information database 10a, VOC database 10b, a required service characteristic extraction unit 20, a required service characteristic generation rule 20a, a required service characteristic database 20b, a required service characteristic evaluation unit 30, an EM evaluation unit 40, an EM database 30a, a target EM value setting unit 50, a product sales strategy information database 30b, a product sales strategy analysis unit 60, and an input/output unit 70.

The VOC collection unit 10 not only collects and transfers to the required service characteristic extraction unit 20 VOC recorded with user's preferences for the subject product (recorded with real and unprocessed voice), but also gathers these VOC into the VOC database 10b as well as saves in the user information database 10a user attribute information including user identification information who inputs the VOC during VOC collection and scene information showing the situations under which the subject product is used. The user attribute information includes information such as name of the user from whom VOC was collected and level of decision-making authority over purchase of the target product. It should be noted that this VOC is information either saved as audio data of the user's voice or data described based on the content of the discussion.

The required service characteristic extraction unit 20 converts the VOC transferred from the VOC collection unit 10 into required service characteristics (customer requirements: CR) by applying, for example, the required service characteristic generation rule 20a, and saves the converted required service characteristics in the required service characteristic database 20b. The required service characteristic (CR) is information related to preferences recognized as a real benefit which indicate status of the service desired by the user for a service accompanying the target product and is obtained from the user's VOC recorded with various abstract values such as what was merely said about target numbers or what was said about desired functions through application of the required service characteristic generation rule 20a. This required service characteristic generation rule 20a functions to convert the collected user's VOC to required service characteristic (CR) by employing a description where user's benefit on purchasing and using a product of interest is recited.

The required service characteristic evaluation unit 30 calculates the level of importance of each required service characteristic and the level of user satisfaction with the company and with other companies using the input user survey results with respect to required service characteristic groups extracted by the required service characteristic extraction unit 20. The calculation result is then output as a graph through the input/output unit 70, linked to each required service characteristic, and output to the required service characteristic database 20b.

The EM evaluation unit 40 gives a weight to each EM by calculating allotment based on the degree of interrelated strength/weakness (correlation) between the respective groups of evaluation indices stored in the EM database 30*a* for each subject product and subject product group, and the required service characteristics extracted by the required service characteristic extraction unit 20, and then selects the EM considered the most important metric by the user In this embodiment, the EM are metrics that can quantitatively measure the level of potential benefits of the user achieved regarding service accompanying subject product and in this embodiment are indices allowing numeric quantitative evaluation. Weighted EM are mapped to required service characteristics (CR) and output to the product sales strategy information database 30*b*.

In other words, first, as to each required service characteristics (CR), the weighted CR are calculated according to user evaluation input through a survey or the like. Then, as to each EM, allotments are calculated based on the degree of interrelated strength/weakness (correlation) between the weighted CR and the EM, so that a score for each EM is obtained by means of weighted summing operation. Thus, a target EM are selected based on the calculated score of each EM.

The target EM value setting unit 50 not only selects the EM to be used for product sales strategy formulation, but also sets the specific target value for that EM based on the current EM value of the company and other companies input regarding each EM and the weight of each EM calculated by the EM evaluation unit 40.

The product sales strategy analysis unit 60 selects the product sales strategy proposal that is expected to reach the target value for the subject EM selected by the target EM value setting unit 50 from the plurality of product sales strategy proposals (sales strategy concepts) regarding the service accompanying subject product stored in the product sales strategy information database 30*b*. More specifically, a sales strategy proposal (subject service) is selected for the subject product for each product sales strategy proposal (sales strategy concept) by calculating worth and cost upon a two-dimensional graph.

The input/output unit 70 is provided locally for the product sales support device 100 via various input/output devices or remotely via a network. At each of the various stages including, for example, VOC collection, required service characteristic extraction, required service characteristic evaluation, EM evaluation, target EM value setting, and product sales strategy analysis, the input/output unit 70 provides an input/output screen for an operator (e.g. sales staff member) and transfers the input information to either the required service characteristic extraction unit 20, the required service characteristic evaluation unit 30, the EM evaluation unit 40, the target EM value setting unit 50, or the product sales strategy analysis unit 60.

Next, process order for the product sales support method according to the first embodiment of the present invention is described.

FIG. 2 is a flowchart showing an abbreviated processing algorithm for the product sales support method according to the first embodiment of the present invention.

To begin with, in the VOC collection unit 10, which users are appropriate for VOC collection is determined and VOC is collected from users within a set range of customers or end users (step S10).

In the required service characteristic extraction unit 20, this collected VOC is analyzed, and what real user requirements are included in the VOC and ultimately what the user feels are the benefits of a service accompanying the subject product are extracted as preference information regarding the service reflected by the user preferences, namely as required service characteristics (CR) (step S20).

In the required service characteristic evaluation unit 30, evaluation processing for each required service characteristic (CR) is carried out, and a subject required service characteristic (CR) is selected for use in product sales strategy formulation (step S30).

In the EM evaluation unit 40, the interrelated strength/weakness (correlation) between the required service characteristic (CR) and the EM that is a functional metric necessary for implementing the required service characteristic (CR) is evaluated upon a two-dimensional matrix to weight each EM (step S40).

In the target EM value setting unit 50, the EM to be used for product sales strategy formulation is selected and the target value for that EM is set (step S50).

In the product sales strategy analysis unit 60, the product sales strategy proposal having the optimum cost/worth balance of the product sales strategy proposals is selected as the subject service expected to reach the selected target EM value (step S60).

FIG. 3 is a flowchart showing detail of the processing in the VOC collection step (step S21) in FIG. 2.

In the input/output unit 70, a VOC input screen is displayed (step S101). A VOC of user is input to the VOC input screen through the input/output unit 70 (S103). This VOC is input together with information showing the individual name of the user from whom the VOC has been collected and a user weight (step S105). The information indicating this user weight is a weight (score) set in several stages and indicates what level of decision-making authority that user has regarding subject product purchase. It should be noted that step S103 and step S105 can be executed in any order, and may even be carried out simultaneously.

The user's individual name and user weight corresponding to the VOC, and each VOC input in step S103 and step S105 are saved in the VOC database (step S107). The user weight input in this step is used to apply a weight for evaluation during the required service characteristic evaluation value calculation in a subsequent required service characteristic evaluation step (S30).

For instance, in the case where the subject product is memory, since subject product specifications are tied up so as to conform to required industry standard specifications, the user having main decision-making authority regarding memory product purchase is the person in charge of purchasing a product. Meanwhile, in the case where the subject product is microcomputers or system LSI, software embedded therein must be developed by the software manufacturer (user) side that purchases the product. Therefore, it is important that the product specifications facilitate software development, and that the user having main decision-making authority regarding purchase of these products be the person in charge of software development.

FIG. 4 illustrates an example of a VOC input screen that has been input with VOC. The input VOC 41 is shown as unsorted VOC from a plurality of users.

FIG. 5 is a flowchart showing detail of the processing in the required service characteristic extraction step (step S20) in FIG. 2.

To begin with, a VOC is read out from the VOC database 10*b* (step S201). The read-out VOC is displayed upon the VOC related information input screen through the input/output unit 70.

Figure 6:
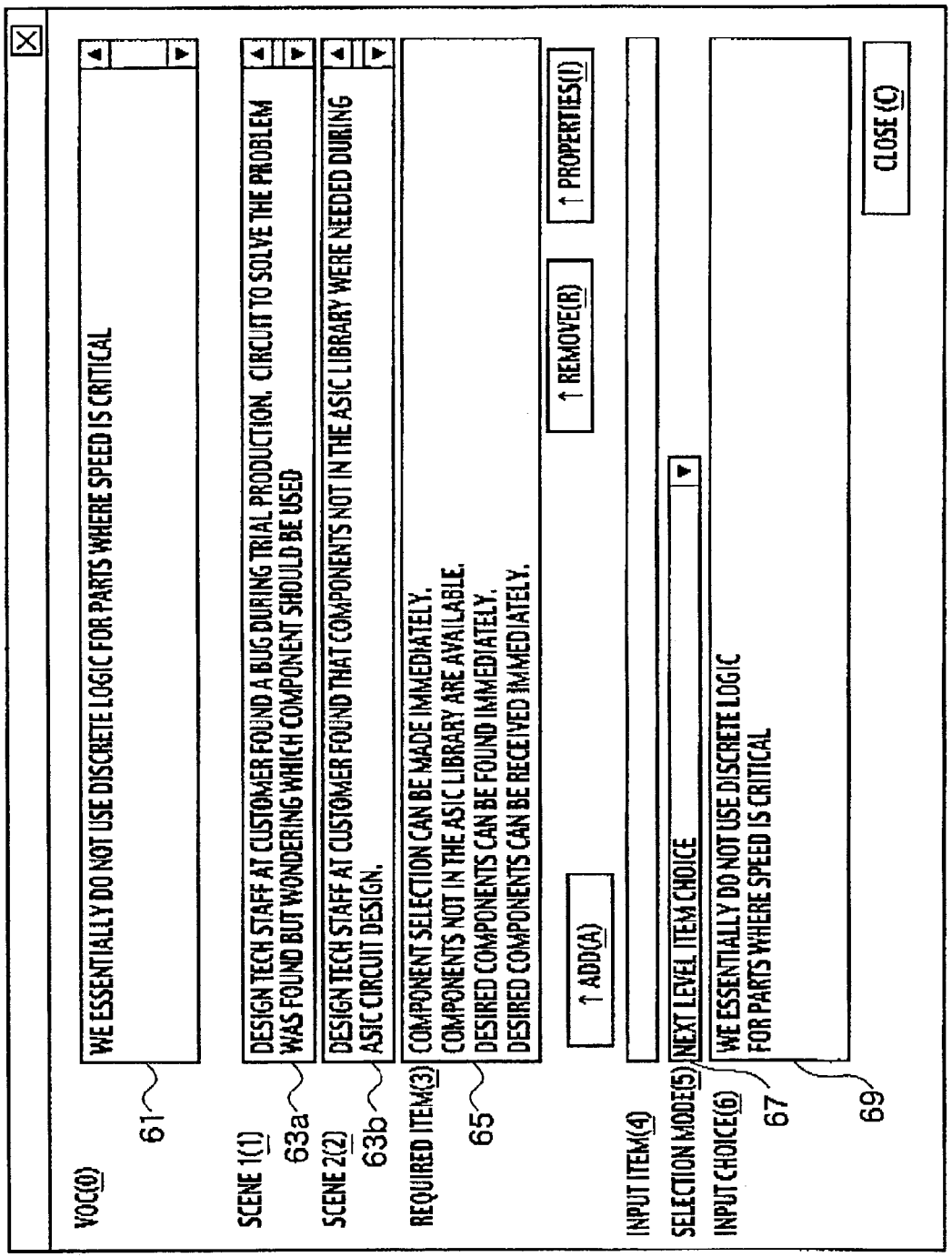
FIG. 6 illustrates an example of a VOC related information input screen displaying with read-out VOC.

FIG. 6 illustrates an example of a VOC related information input screen displaying with read-out VOC. In VOC input field 61 "WE ESSENTIALLY DO NOT USE DISCRETE LOGIC FOR PARTS WHERE SPEED IS CRITICAL" is displayed. Scene information is then input for this displayed VOC (step S205). In the VOC related information input screen in FIG. 6, a description regarding the scene on the user side that may serve as VOC background in the VOC input field 61 is respectively input to scene input fields 63a and 63b.

In the VOC related information input screen in FIG. 6, further analysis of the VOC based on these pieces of scene information is carried out. Required items relating to the read-out VOC are selected from a required item candidate group displayed in an input candidate field 69 and input to required item input field 65. It should be noted that the required items give a description of conditions before required service characteristics are converted from the VOC. In this embodiment, it is not always necessary to generate required items. Required service characteristics may be generated directly from the VOC.

Figure 8:
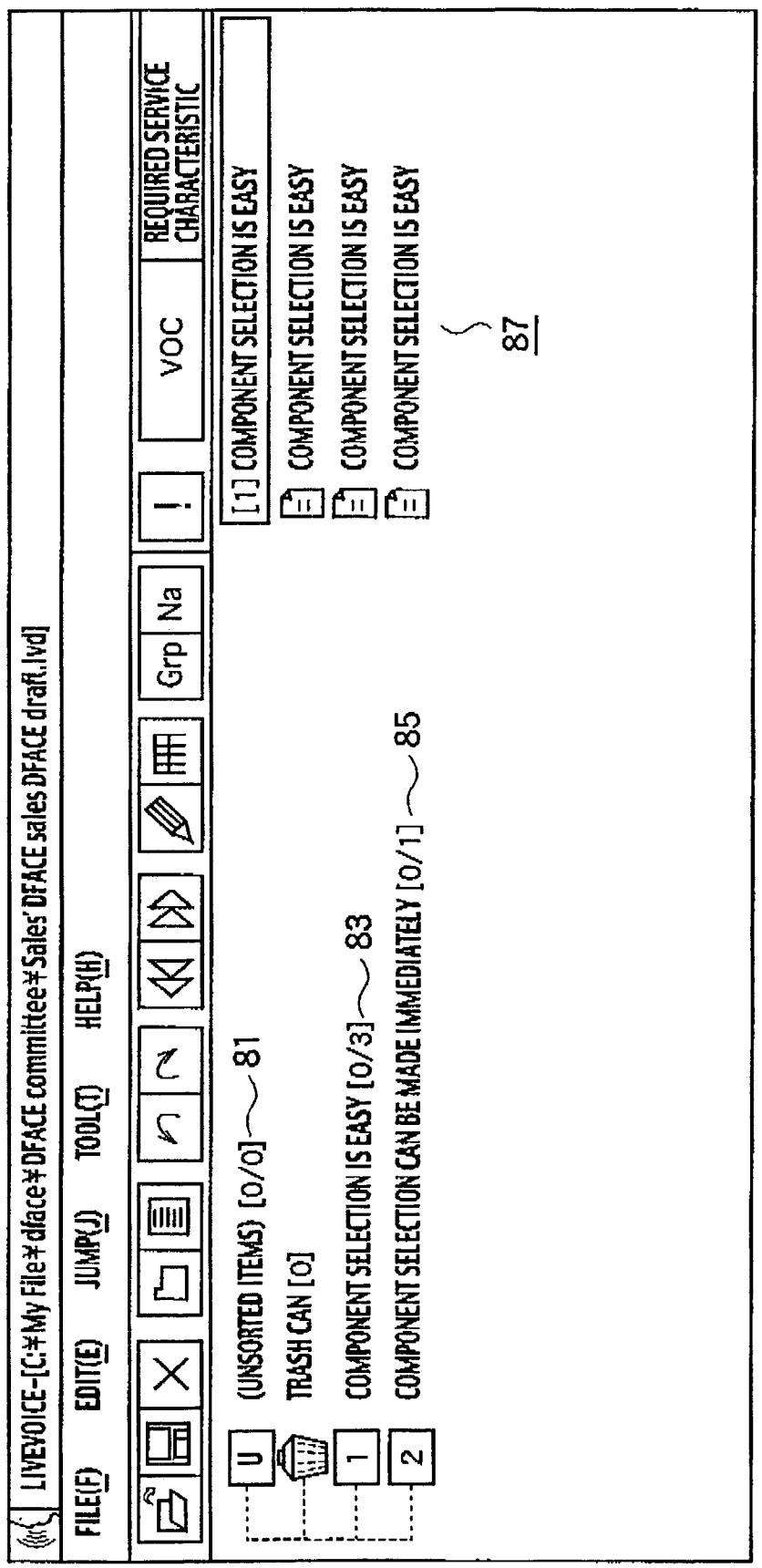
FIG. 8 illustrates an example of an operation screen for grouping required service characteristics after converting required service characteristics from VOC input in the VOC related information input screen.

Next, a required service characteristic generation rule is read out from required service characteristic generation rules 20a (step S207) By applying this read-out required service characteristic generation rule to, for example required item "COMPONENT SELECTION SHOULD BE MADE IMMEDIATELY" (required item field 71 of FIG. 7), a required service characteristic, "COMPONENT SELECTION IS EASY" (required service characteristic field 73), which is an expression that represents the user's benefit, can be obtained through conversion (step S209). The obtained required service characteristic is then sorted into groups of similar required service characteristics (step S211). As shown in FIG. 8, the obtained required service characteristic (e.g. "COMPONENT SELECTION IS EASY" in required service characteristic field 87) is sorted from the UNSORTED ITEMS 81 to the "COMPONENT SELECTION IS EASY" group 83.

The sorted required service characteristics are saved in the required service characteristic database 20b (step S213).

Figure 9:
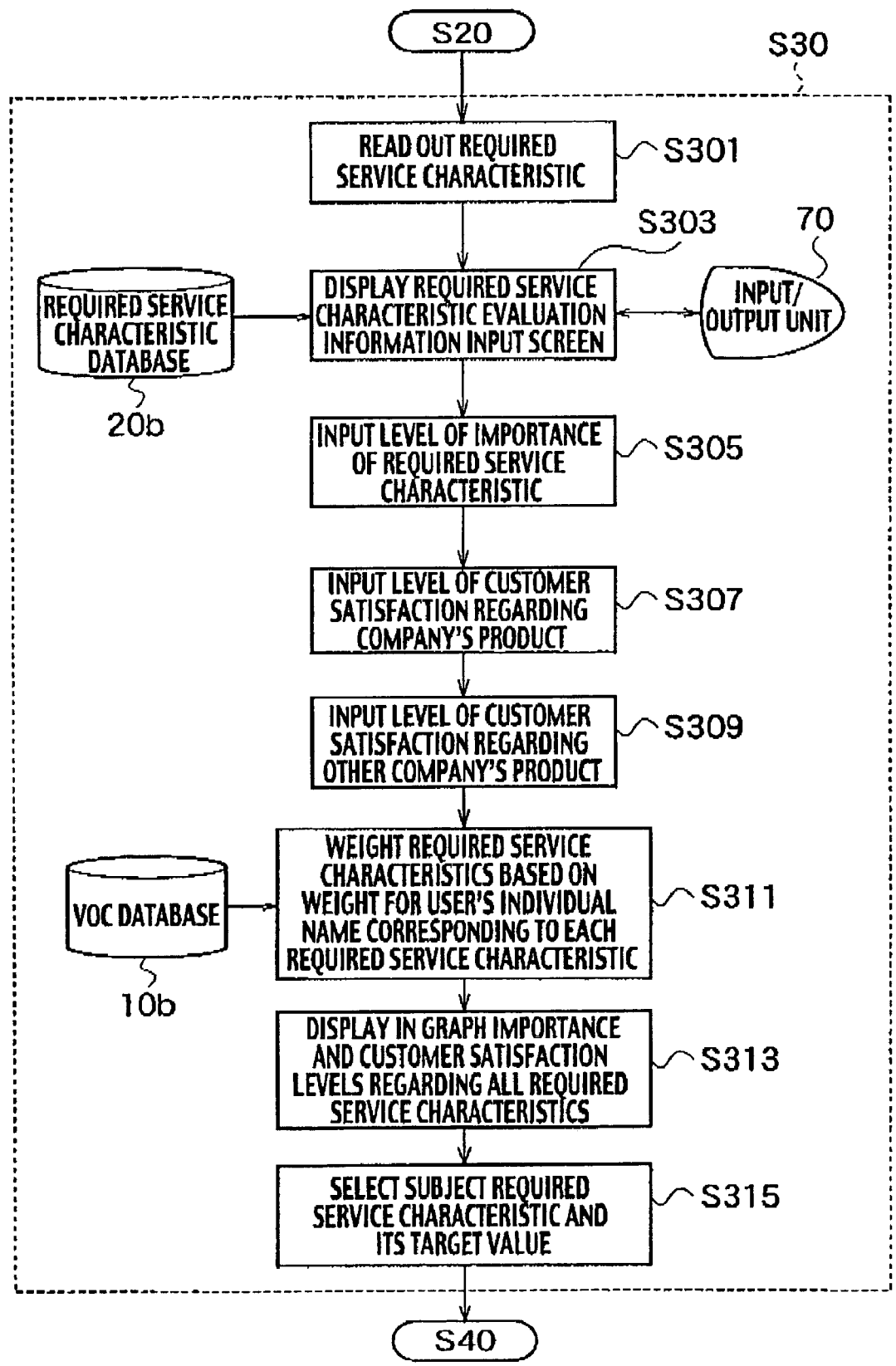
FIG. 9 is a flowchart showing detail of the processing in the required service characteristic evaluation step (step S30) in FIG. 2.

FIG. 9 is a flowchart showing detail of the processing in the required service characteristic evaluation step (step S30) in FIG. 2.

Figure 10:
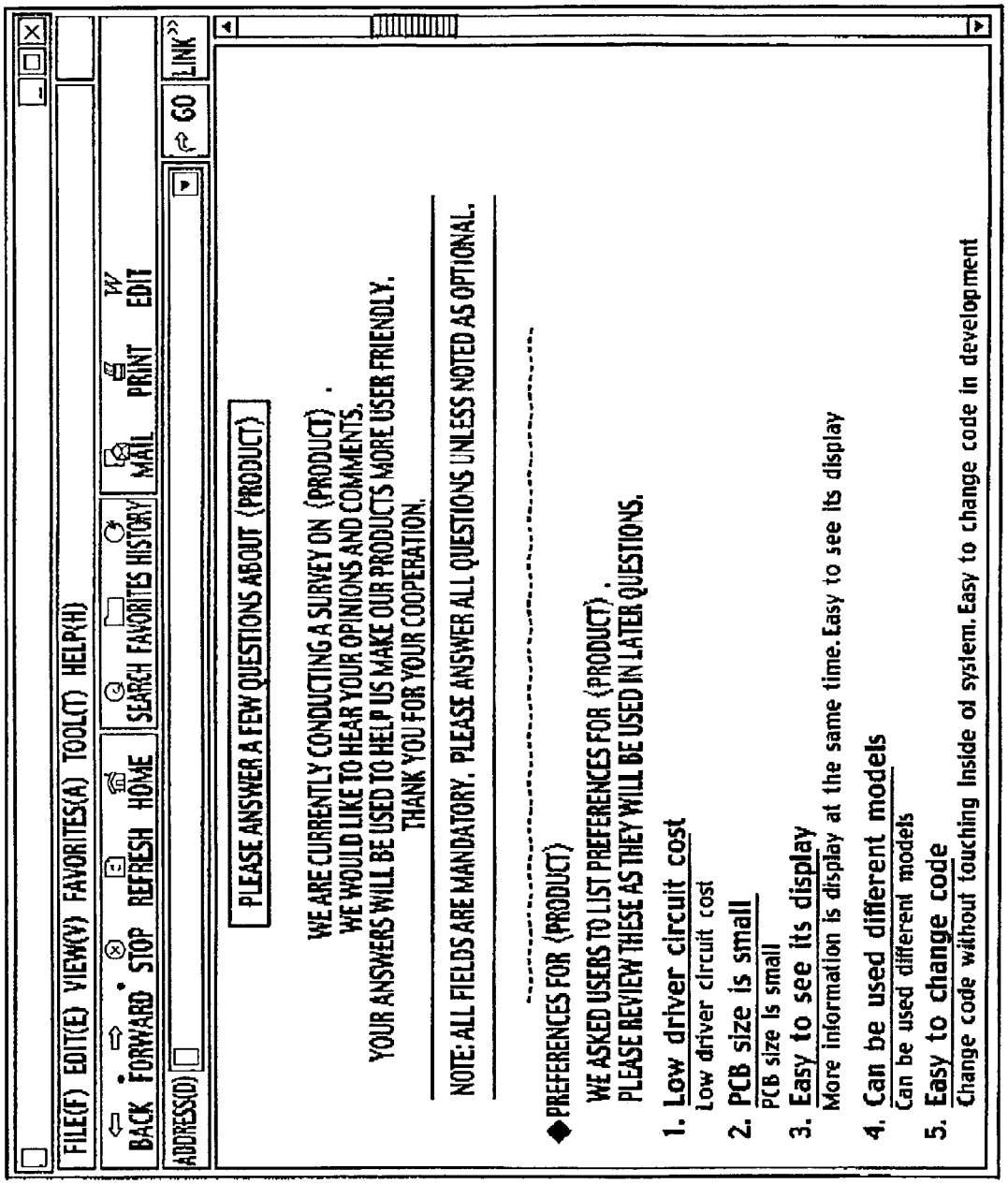
FIG. 10 illustrates an example of a screen requiring/ prompting survey input regarding each required service characteristic for the user (customer)

A required service characteristic is read out from the required service characteristic database 20b (step S301). The read-out required service characteristics are displayed upon a required service characteristic evaluation information input screen through the input/output unit 70 (step S303). FIG. 10 illustrates an example of a screen prompting survey input regarding each required service characteristic for the user (customer). For each required service characteristic, input of at least the level of importance, the level of customer satisfaction regarding the company's product, and the level of customer satisfaction regarding another company's product is prompted fur the user through the survey screen. In an exemplary embodiment, when inputting the level of importance for the required service characteristic, for example two required service characteristics that can be obtained from the combination of all of the required service characteristics are displayed, and by selecting one of the two options, the respective levels of importance for the required service characteristic may be calculated.

FIG. 11 illustrates an example of a required service characteristic evaluation information input screen displayed in step S303. Based on the survey results obtained from the user, the level of importance for each required service characteristic (step S305), the level of customer satisfaction regarding the company's product for each required service characteristic (step S307), and the level of customer satisfaction regarding another company's product for each required service characteristic (step S309) are input into the required service characteristic evaluation information input screen. More specifically, as shown in FIG. 11, level of importance (importance level input field 117), level of satisfaction regarding company's product (company satisfaction input field 119), and level of satisfaction regarding another company's product (other company satisfaction input field 121) are respectively input regarding each required service characteristic displayed in the required service characteristic field 111. Each required service characteristic displayed in the required service characteristic display field 111 can be deleted, inserted, or jumped by manipulating (e.g., clicking with a pointing device such as a mouse) the respective required service characteristic operation buttons 113 (DELETE, INSERT, AND JUMP). In the same manner, each EM displayed in each column of the display can be deleted, inserted or jumped by manipulating the respective EM operation buttons 115.

Next, the weight of the user's individual name corresponding to each required service characteristic is read out while referencing the VOC database 10b and the user information database 10a. Using this user weight, the evaluation score for each required service characteristic, in other words each score for the level of importance 117, level of company satisfaction 119, and level of other company satisfaction is weighted (step S311).

After weighting using the user's individual name weight, the required service characteristic importance level and customer satisfaction levels for all of the required service characteristics are displayed in an appropriate graph in accordance with operator's manipulation (step S313).

FIG. 12 illustrates an example of a comprehensive display image, specifically a graph image, displayed in step S313. For each required service characteristic item along the horizontal axis of the graph, the company customer satisfaction level 123 and competitor customer satisfaction levels 125a and 125b are shown with bar graphs, and the required service characteristic importance level is shown with a broken line graph 121. Referencing FIG. 12, it can be easily recognized that for the required service characteristic "COMPONENT SELECTION IS EASY", customer satisfaction it low compared to the importance level thereof. An increase in product share through product sales growth can be expected by improving the customer satisfaction level of this required service characteristic "COMPONENT SELECTION IS EASY". Referencing the graph of FIG. 12, the operator can visually recognize that, although it is a required service characteristic with a high level of importance, the level of customer satisfaction is currently low for both the company and the other companies for the required service characteristic "COMPONENT SELECTION IS EASY" and can select it as a subject required service characteristic for sales strategy formulation. Alternatively, the difference between the required service characteristic importance level and the company/other company customer satisfaction level can be calculated, and a subject required service characteristic candidate clan be automatically selected based on this difference.

In addition, referencing the graph of FIG. 12, a target value regarding the company customer satisfaction level can be selected for the subject required service characteristic (step S315). For example, in FIG. 13, while the required service characteristic "COMPONENT SELECTION IS EASY" currently has a company customer satisfaction level of 4.8, other company customer satisfaction levels of 4.5 and 4.4, in the planned quality field 131, the target value for the required service characteristic is set to 8.5. It should be noted that in FIG. 13, the rate of improvement field 133 displays the rate of improvement graded for the targeted customer satisfaction level against the current company customer satisfaction level, and the sales point field 135 displays how much of a sales point that required service characteristic will become in product sales for the company.

FIG. 14 displays as bar graphs the current company customer satisfaction level 143 and target customer satisfaction level 145 for the subject required service characteristic selected in step S315 and for other required service characteristics. In addition, the level of importance for each of the required service characteristics is shown as a broken line graph overlapping the bar graphs It can be visually confirmed that a target in the product sales strategy has become improving the current customer satisfaction level of the subject required service characteristic selected in step S315, "COMPONENT SELECTION IS EASY", from 4.8 to 8.5.

Figure 15:
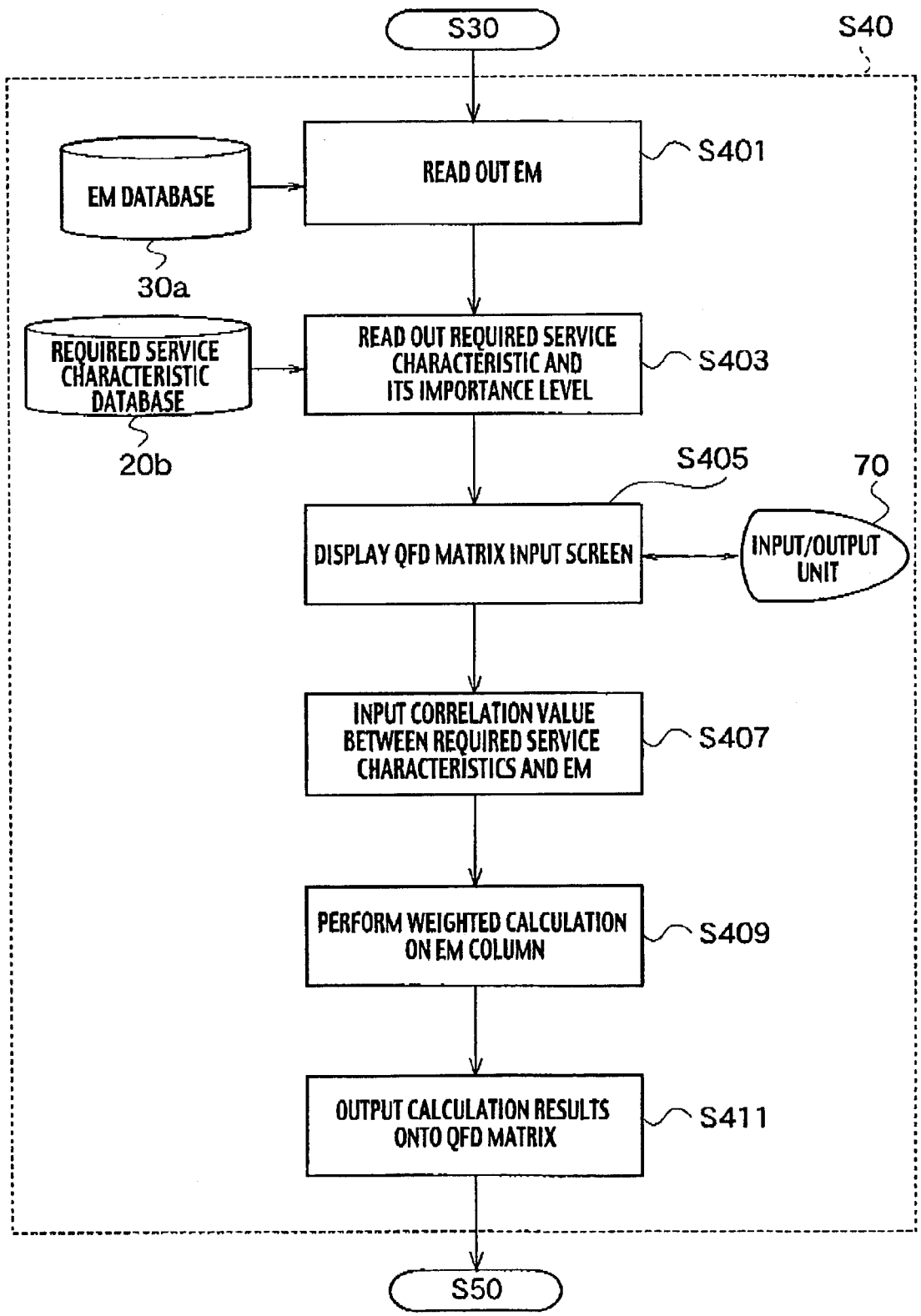
FIG. 15 is a flowchart showing detail of the processing in the EM evaluation step (step S40) in FIG. 2.

FIG. 15 is a flowchart showing detail of the processing in the EM evaluation step (step S40) in FIG. 2.

An EM is read out from the EM database 30*a* (step S401). Moreover, a required service characteristic and the level of importance for that required service characteristic is read out from the required service characteristic database 20*b* (step S403). A quality function development (QFD) matrix screen, which is a screen prompting an operator to input the correlation between this required service characteristic and the EM is displayed through the input/output unit 70 (step S405).

Figure 16:
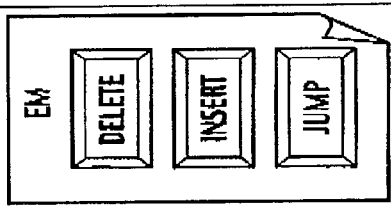
FIG. 16 illustrates an example of a QFD matrix screen image for inputting a correlation value between a required service quality and an EM.

FIG. 16 illustrates an example of this QFD matrix screen image.

A matrix of the required service characteristics and EM is configured by displaying the respective required service characteristics in the rows of the required service characteristic display field 167 and the respective EM in the columns of the display field 163 for the EM, which are indices for quantitatively measuring the required service characteristics.

Input of the correlation value between the required service characteristic and the EM is prompted to this QFD matrix input screen (step S407). In FIG. 16, in the correlation value input fields 165, a filled in circle denotes strong correlation, a hollow circle denotes medium-range correlation, a triangle denotes weak correlation, and a space denotes no correlation.

Based on the input correlation value, weighted calculation of the sum of the correlation values is performed for each EM column using weight derived from the level of importance of each required service characteristic (step S409).

The result of the weighted calculation is output and displayed upon the QFD matrix screen (step S411).

Figure 17:
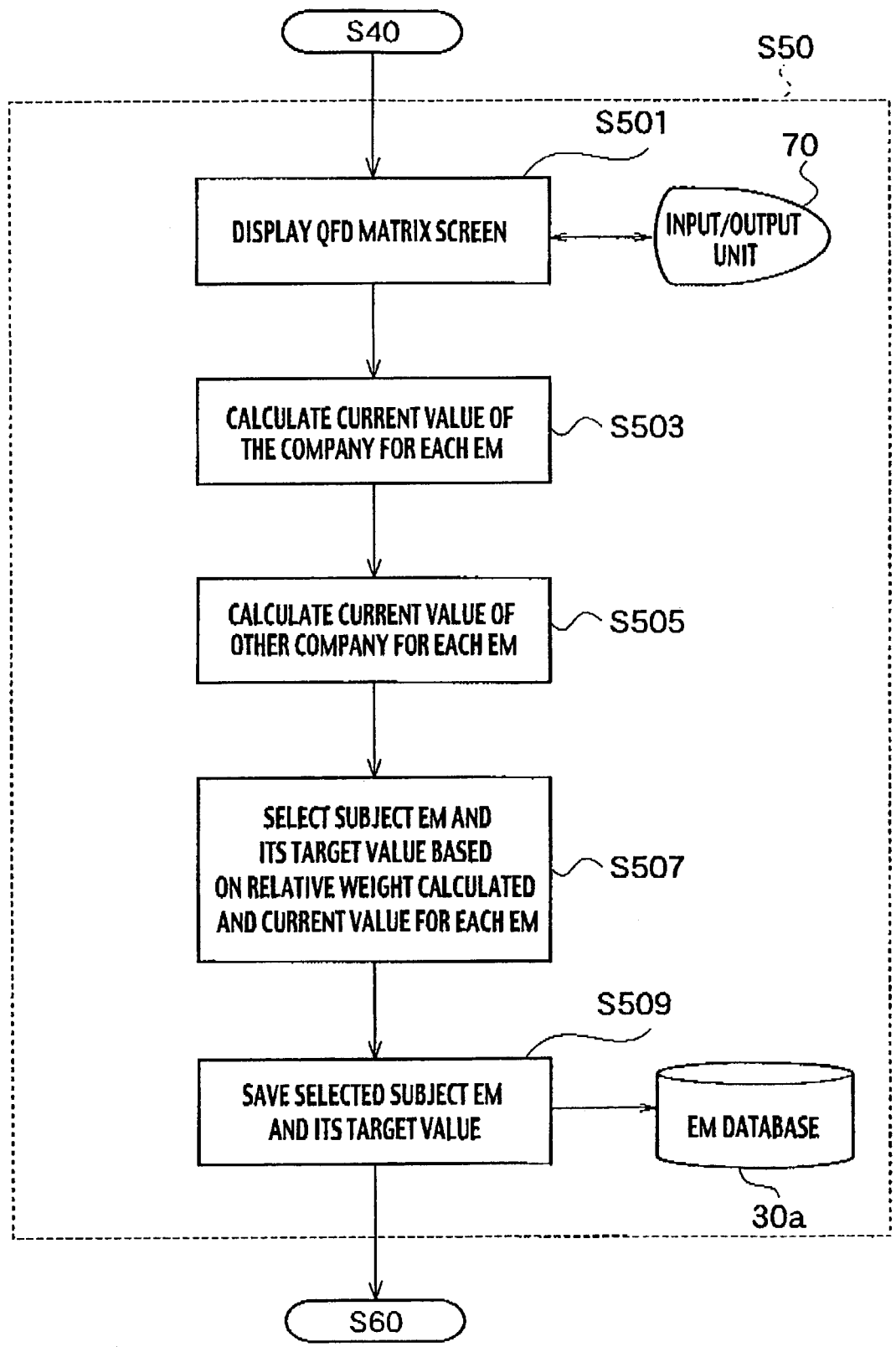
FIG. 17 is a flowchart showing detail of the processing in the target EM value setting step (step S50) in FIG. 2.

FIG. 17 is a flowchart showing detail of the processing in the target EM value setting step (step S50) in FIG. 2.

A quality function development (QFD) matrix screen is displayed through the input/output unit 70 (step S501).

Figure 18:
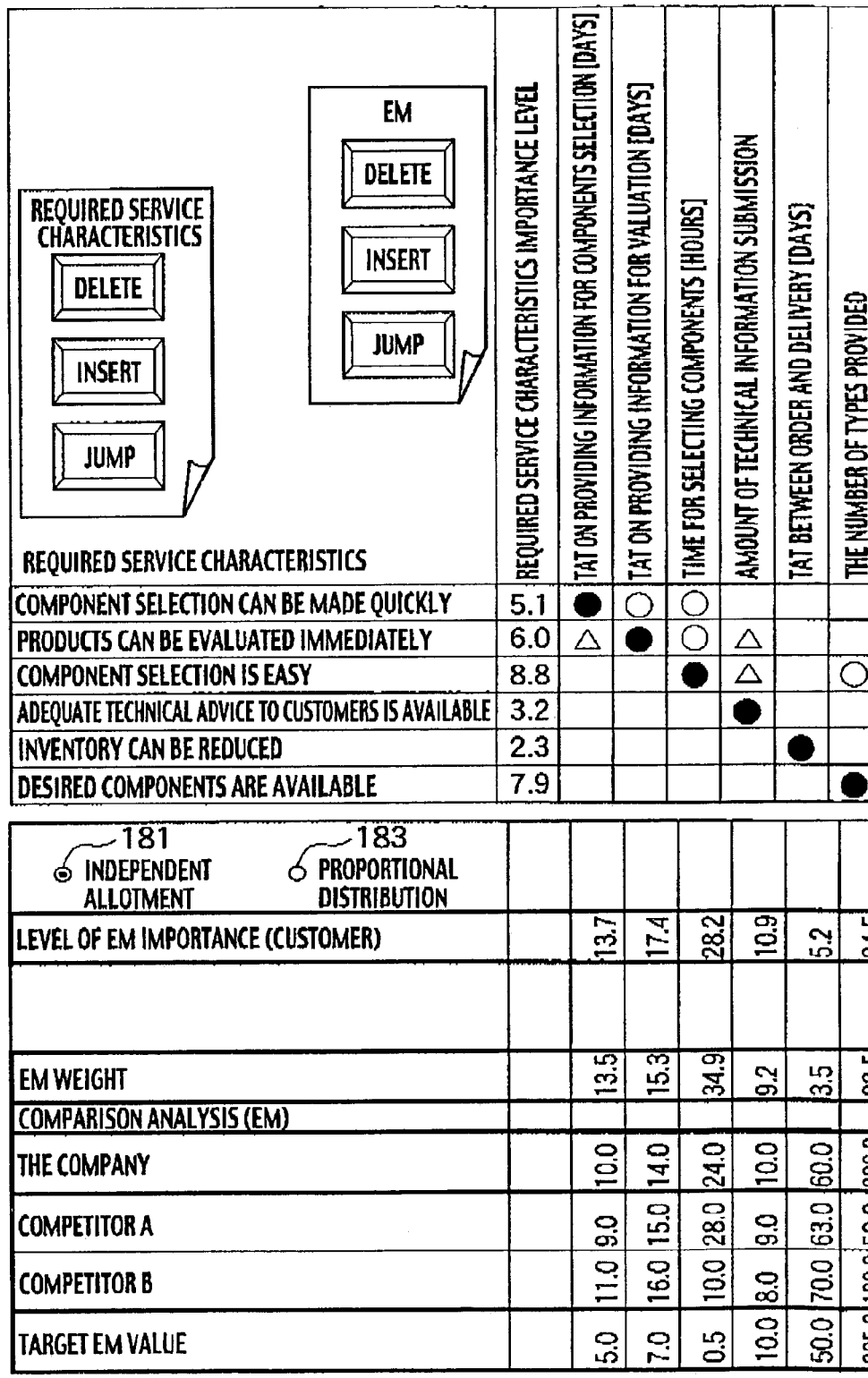
FIG. 18 illustrates an example of a QFD matrix screen for selecting an EM to become key to product sales strategy formulation and setting the target value thereof.

FIG. 18 illustrates an example of a QFD matrix screen for selecting an EM to become key to product sales strategy formulation and setting the target value thereof.

The level of importance for each EM is calculated based on the required service characteristic importance level (field 161 in FIG. 16) and displayed in the EM importance level field 185. It should be noted that the EM importance level field 185 in FIG. 18 requires the numeric value in the case where independent allotment (button 181 in FIG. 18) is selected, however, it is also possible to use proportional distribution (button 183) for EM importance level calculation. This proportional distribution is a method for calculating an EM importance level after adjusting the correlation value so that each of the required service characteristic correlation value score totals are all the same value. In the case where there is deviation in the correlation values first input, it is possible to adjust that deviation. In other words, with which EM and to what extent the user (customer) evaluates is quantitatively indicated with the numeric value in the EM importance level field 185. Meanwhile, the weight for evaluation of each EM on the product offer side that is, how much of a sales point, is calculated as a score for each EM and displayed in the evaluation EM weight field 187.

Moreover, the in-house company current EM value measured for each EM is displayed in the in-house company current EM value field 191 and the other company current EM value measured for each EM is displayed in the other company current EM value field 193 (step S503, step S505).

A subject EM and target value thereof are determined for product sales strategy formulation based on the EM importance level from the relative weight calculated for each of these EM and the in-house company and other company current EM values (step S507). The determined subject EM and target value thereof are saved in for example the EM database 30*a* or another storage device (step S509). More specifically, it is possible to select a target EM value (target EM value display field 195 in FIG. 18) that is attainable and improves customer satisfaction, in other words is significant enough to directly increase sales, by comparing the relative weight obtained as the EM importance level and the in-house company and other company current EM values. In FIG. 18, the target value regarding the EM, "TIME SPENT SELECTING COMPONENTS", is set to 0.5 hours.

Figure 19:
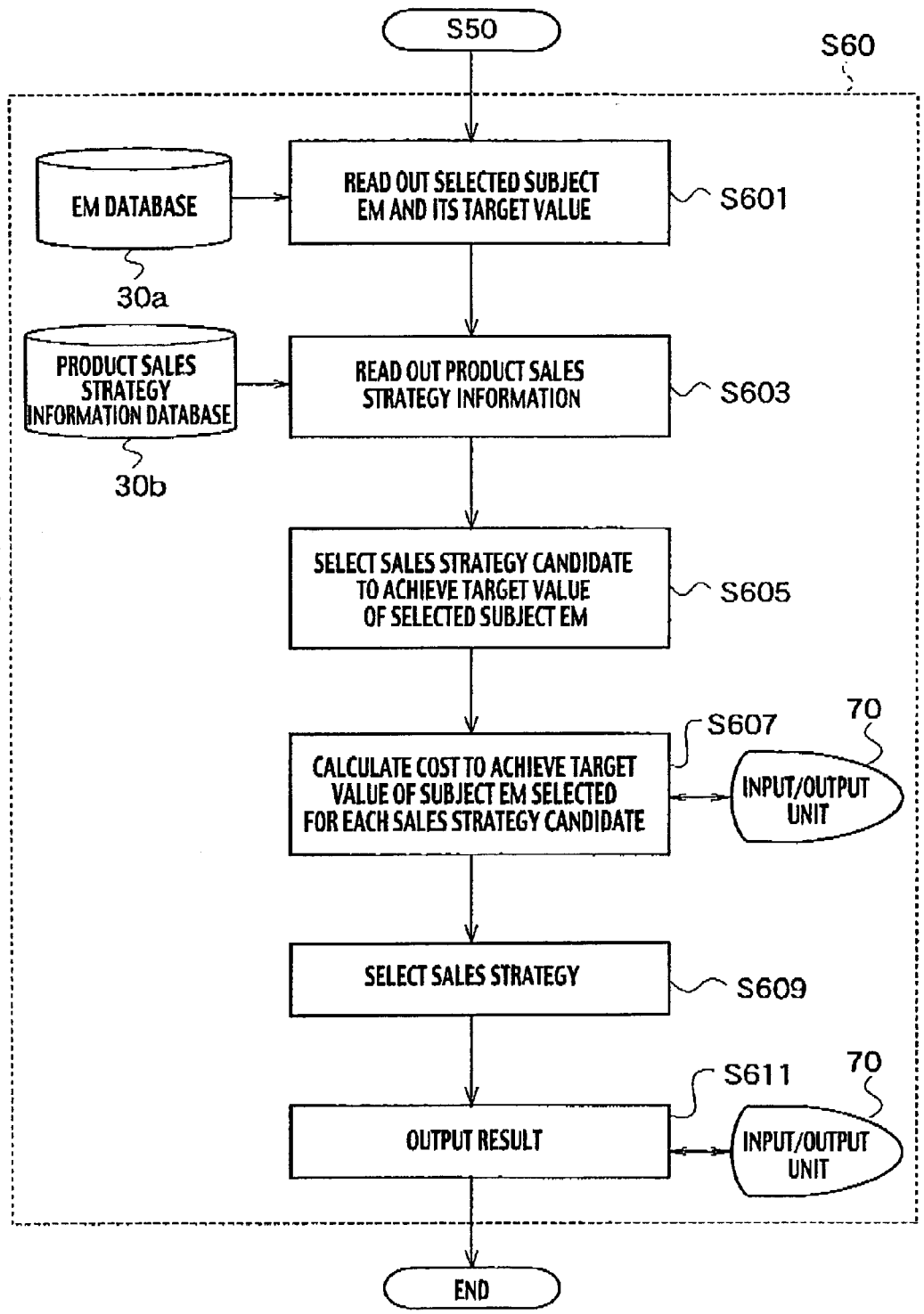
FIG. 19 is a flowchart showing detail of the processing in the product sales strategy analysis step (step S60) in FIG. 2.

FIG. 19 is a flowchart showing detail of the processing in the product sales strategy analysis step (step S60) in FIG. 2.

The selected subject required service characteristic, EM, and the respective target values thereof are read out from the EM database 30*a* (step S601). Meanwhile, from the product sales strategy information database 30*b*, product sales strategy information is read out (step S603). Next, sales strategy proposal candidates, which are means for reaching the selected subject EM target value, are selected from the read-out sales strategy information (step S605). Costs required for reaching the selected EM target value are calculated for each of these sales strategy candidates and the results are displayed through the input/output unit 70 (step S607). Ultimately, through the procedures described in the foregoing, the service is selected for the sales strategy to directly increasing sales in order to obtain the best user satisfaction regarding a service accompanying product (step S609). The selected sales strategy is output and displayed as needed via the input/output unit 70 (step S611).

In the case where the target value for the EM, "TIME SPENT SELECTING COMPONENTS" is set to 0.5 hours, for example, it is assumed that there are the possible sales strategy proposals corresponding with this EM target value of either (1) increasing information on the company product master at the customer, and (2) creating a product master that covers most component information at the company (in-house) and providing it via the web. In this case, the costs required to achieve the EM target value for both sales strategy proposals are calculated. As a result, when an achievement degree of target EM value with respect to the cost, namely cost performance, of (2) creating a product master that covers most component information at the company (in-house) and providing it via the web, is greater than that of (1) increasing information on the company product master at the customer, (2) creating a product master that covers most component information at the company (in-house) and providing it via the web is selected as the sales strategy for the subject product that will most improve customer satisfaction of the users.

Figure 20:
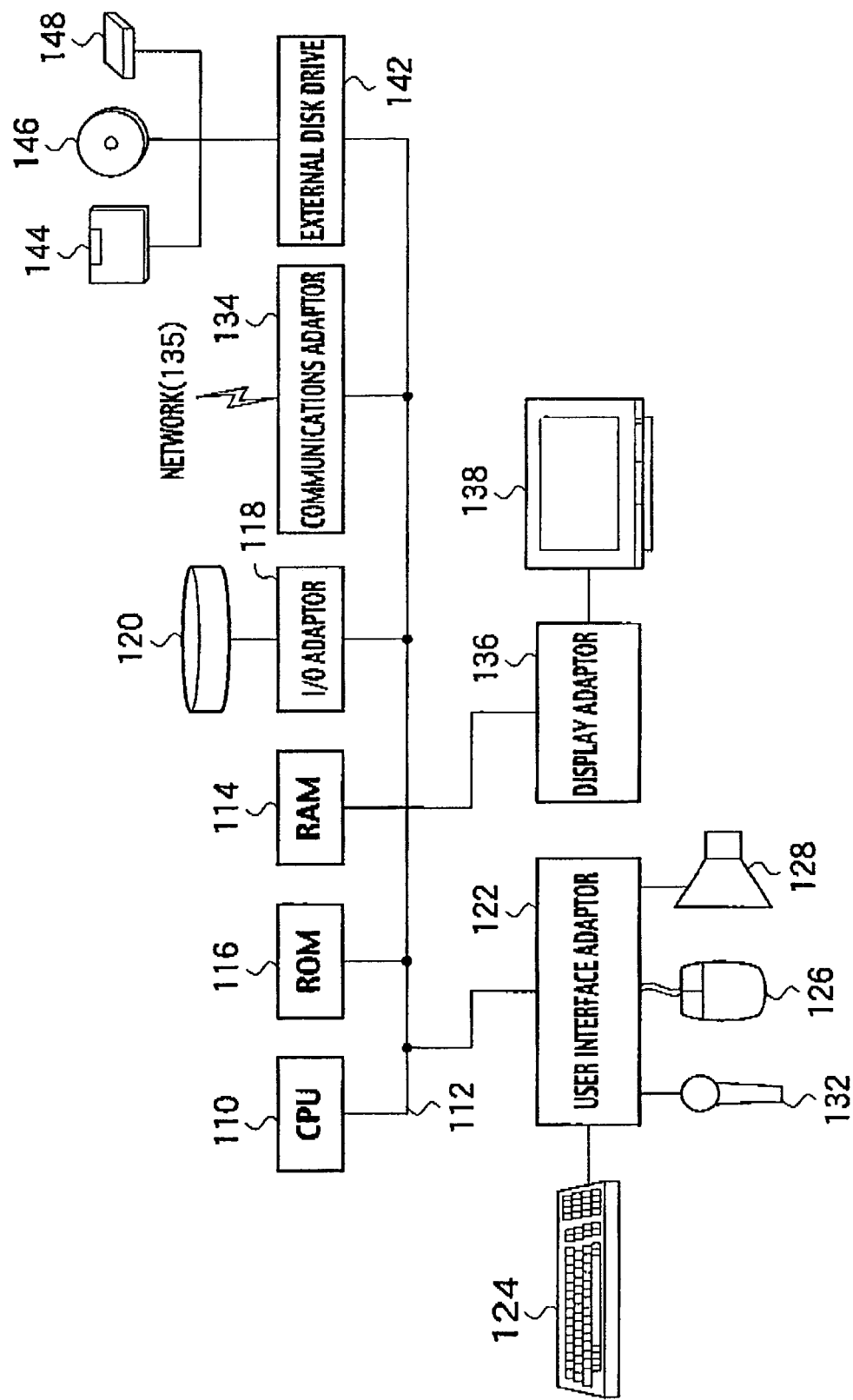
FIG. 20 is a block diagram illustrating the hardware configuration of a product sales support device and product sales support system according to each embodiment of the present invention.

FIG. 20 is a block diagram illustrating the hardware configuration of a product sales support device and product sales support system according to each embodiment of the present invention.

The product sales support apparatus 100 according to each embodiment of the present invention has the exemplary structure shown in FIG. 20. Specifically, the product sales support apparatus 100 according to each embodiment of the present invention is configured by embedding each element of the product sales support processing in a single or a plurality of computer systems.

As shown in FIG. 20, the computer system includes a central processing unit 110 such as a microprocessor and other units interconnected via a system bus 112. This computer system 100 is configured with a random access memory 114; read only memory 116; I/O adapter 118, which connects peripheral devices such as a hard disk unit 120 to the system bus 112; user interface adapter 122, which connects user interface units such as a keyboard 124, mouse 126, speaker 128, microphone 132 or touch screen (not shown in the figures) to the system bus 112; a communications adaptor 134, which connects this computer system to a communications network; a display adaptor 136, which connects a display unit 138 to the system bus 112; and an external disk driver 142, which respectively actuates a floppy disk 114, optical disk 146, and various memory cards 148.

A product sales support program for executing each of the functions of the product sales support processing according to the present invention is stored in any of the various computer readable storage media typified by a floppy disk 114, optical disk 146, or the various types of memory cards 148, and it is possible to install the product sales support program for executing various functions of product sales support processing of the present invention stored in these storage media by performing a predetermined reading-out operation from these storage media via an external disk driver. Product sales support processing of the present invention is carried out by loading these programs in a random access memory 114 and executing these with the central processing unit 110. It should be noted that the above-mentioned product sales support program may be executed in a single computer or may be executed in a plurality of network connected computers In the case where executed in a plurality of computers, a module operating in the respective computers is loaded into the respective computers with a storage medium stored therewith.

Figure 21:
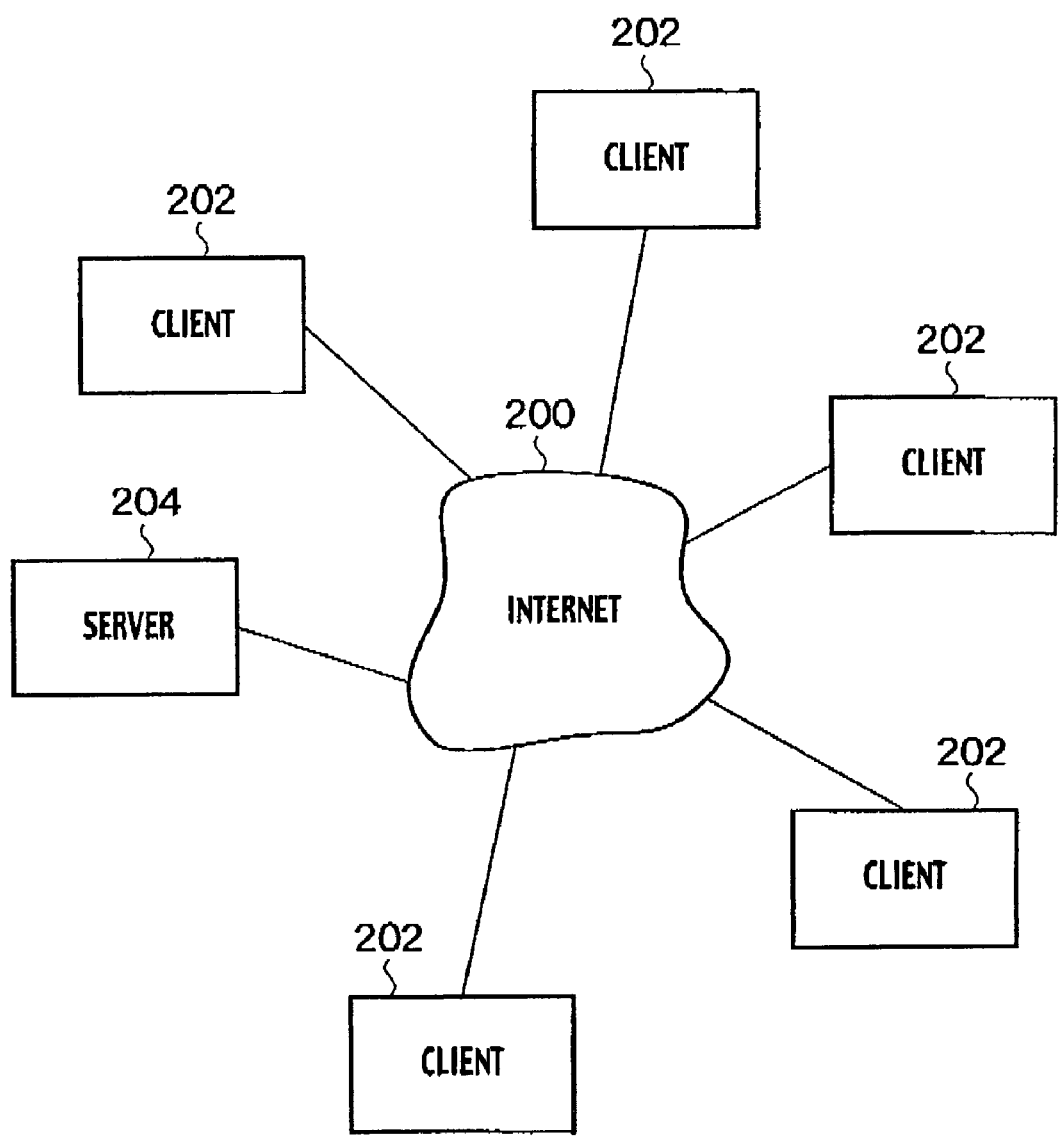
FIG. 21 illustrates an example of an embodiment of the present invention loaded on a network such as the Internet.

FIG. 21 illustrates an example of an embodiment of the present invention loaded on a network such as the Internet. The product sales support system according to the present invention includes a plurality of client machines 202 connected to a server 204 via a network 200. Large-scale implementation of this embodiment is also possible by arranging a product sales support unit 100 on the server 204, arranging an input/output unit 60 on the client machines 202, and loading the product sales support system according to this embodiment on the network.

It should also be noted that in the above-mentioned embodiment, required service characteristics and EM have been described as descriptions regarding service accompanying product offer. However, it is to be contemplated that these are mere examples and may also be descriptions regarding the product itself which is to be provided.

The following effects may be obtained with this embodiment.

Specifically, with this embodiment, without dependency on the sales staff member on experience or intuition, potential requirements of users for product or service which will directly contribute to increase product sales are selected based on VOC collection, and it is possible to systematically and easily formulate a product sales growth strategy or a service accompanying product offer.

Furthermore, it is possible to understand the current level of customer satisfaction for the company and competitor from a user requirement group for service accompanying product obtained from VOC, and quantitatively and visually select required service characteristics which will contribute to increased product sales and where efforts should be focused.

Furthermore, by quantitatively selecting a required service characteristic that contributes to increased sales of the subject product from a generated CR group and setting the specific target value for the required service characteristic selected, it is possible to easily set the EM for quantitatively evaluation of the degree to which user preferences are met as well as the specific target of that EM.

As described in the foregoing, in accordance with the embodiment of the present invention, without dependency on the sales staff member on experience or intuition, potential requirements of users for a product or a service which will directly contribute to increased product sales are selected based on VOC collection, and systematic tools for easy formulation of product sales growth strategy are provided.

What is claimed is:

1. A method of product sales support, comprising:
using a computer, generating required service characteristic information that indicates user requirements for a service related to subject product offer, the user requirements being obtained from user preference data related to the service;
using the computer, storing the required service characteristic information in a storage device;
using the computer, prompting to input user evaluation data regarding each piece of the generated required service characteristic information and user satisfaction level data regarding each piece of the required service characteristic information;
using the computer, outputting a list of the input evaluation data and the input satisfaction level data on a display device in a visually recognizable manner as required service characteristic evaluation information for each piece of the required service characteristic information;
using the computer, prompting selection of the required service characteristic evaluation information, and setting a target satisfaction level regarding the selected required service characteristic evaluation information, based on the satisfaction level data and the evaluation data output on the display device; and
using the computer, outputting calculated importance level of each function necessary for implementing the required service characteristic, on the display device based on an input of a correlation value between the required service characteristic information and information of the function necessary for implementing the required service characteristic.

2. The method of claim 1, further comprising:
using the computer, inputting relative weighted data that indicates importance level of subject product purchase of a user providing the user preference data with the user preference data;
wherein in said outputting the required service characteristic evaluation information, the user evaluation data is subjected to weighted calculation, based on the relative weighted data.

3. The method of claim 1, wherein
said outputting the calculated importance level includes outputting a list of second user satisfaction level data calculated for each function necessary for implementing the required service characteristic with the importance level of each function, on the display device, based on the first user satisfaction level data.

4. The method of claim 1, further comprising:

using the computer prompting selection of the function necessary for implementing the required service characteristic, and setting target value of a quantitative metric of the selected function based on the importance level of each function outputted on the display device in said outputting the calculated importance level.

5. The method of claim 4, further comprising:

using the computer selecting a service that either maximizes or minimizes the target value of the quantitative metric of the function necessary for implementing the required service characteristic from a group of services on subject product based on target value of the quantitative metric of the function set in said setting the target value.

6. The method of claim 1, wherein said required service characteristic information generation prompts selection of one of two pieces of the required service characteristic information, so as to input the user evaluation information regarding each piece of required service characteristic information.

7. A product sales support apparatus, comprising:

a required service characteristic information generation unit that uses a computer processor configured to generate required service characteristic information that indicates user requirements for a service related to subject product offer, the user requirements being-obtained from user preference data relating to the service, and store the required service characteristic information in a storage device;

a required service characteristic information collection unit that uses the computer processor configured to prompt to input user evaluation data regarding each piece of the generated required service characteristic information and user satisfaction level data regarding each piece of the required service characteristic information;

a required service characteristic evaluation information output unit that uses the computer processor configured to output a list of the input evaluation data and the input satisfaction level data on a display device in a visually recognizable manner as required service characteristic evaluation information for each piece of the required service characteristic information;

a required service characteristic information target setting unit that uses the computer processor configured to prompt selection of the required service characteristic evaluation information, and to set a target satisfaction level regarding the selected required service characteristic evaluation information based on the evaluation data and the satisfaction level data output on the display device in said required service characteristic evaluation information output unit; and a quantitative metric information output unit that uses the computer processor configured to output a calculated importance level of each function necessary for implementing the required service characteristic, on the display device based on an input of a correlation value between the required service characteristic information and information of the function necessary for implementing the required service characteristic.

8. The apparatus of claim 7, further comprising:

a relative weighted data input unit that uses the computer processor configured to input relative weighted data that indicates importance level of subject product purchase of a user providing the preference data with the preference data;

wherein said required service characteristic evaluation information output unit subjects the user evaluation data to weighted calculation, based on the relative weighted data.

9. The apparatus of claim 7, wherein said quantitative metric information output unit further outputs a list of second user satisfaction level data calculated for each function necessary for implementing the required service characteristic with the importance level of each function, on the display, based on the first user satisfaction level data.

10. The apparatus of claim 7, further comprising:

a quantitative metric target value setting unit that uses the computer processor configured to prompt selection of the function necessary for implementing the required service characteristic, and set target value of a quantitative metric of the selected function based on the importance level of each function outputted on the display device by said quantitative metric information output unit.

11. The apparatus of claim 10, further comprising:

a service selection unit that uses the computer processor configured to select a service that either maximizes or minimizes the target value of the quantitative metric of the function necessary for implementing the required service characteristic from a group of services on the subject product, based on the target value of the quantitative metric of the function set by said quantitative metric target setting unit.

12. The apparatus of claim 7, wherein said required service characteristic information collection unit prompts selection of one of two pieces of the required service characteristic information, so as to input the user evaluation information regarding each piece of required service characteristic information.

13. A program having instructions when executed by a computer to perform a product sales support process, comprising:

a required service characteristic information generation process, which generates required service characteristic information that indicates user requirements for a service related to subject product offer, the user requirements being obtained from user preference data related to the service, and stores the required service characteristic information in a storage device;

a required service characteristic information collection process, which prompts to input user evaluation data regarding each piece of the generated required service characteristic information and user satisfaction level data regarding each piece of said required service characteristic information;

a required service characteristic evaluation information output process, which outputs a list of the input evaluation data and the input satisfaction level data on a display device in a visually recognizable manner as required service characteristic evaluation information for each piece of the required service characteristic information;

a required service characteristic information target setting process, which prompts selection of said required service characteristic evaluation information and sets a target satisfaction level regarding the selected required service characteristic evaluation information based on the evaluation data and the satisfaction level data output on the display in device in said required service characteristic evaluation information output process; and a quantitative metric information output process, which outputs a calculated importance level of each function necessary for implementing the required service characteristic, on the display device, based on an input of a correlation value between the required service characteristic information and the function necessary for implementing the required service characteristic.

14. The program of claim 13, further comprising:

a relative weighted data input process, which inputs relative weighted data that indicates importance level of subject product purchase of a user providing the preference data with the preference data;

wherein said required service characteristic evaluation information output process subjects the user evaluation data to weighted calculation, based on the relative weighted data.

15. The program of claim 13, wherein said quantitative metric information output process further outputs a list of second satisfaction level data calculated for each function necessary for implementing the required service characteristic with the importance level of each function, on the display device, based on the first user satisfaction level data.

16. The program of claim 13, further comprising:

a quantitative metric target value setting process, which prompts selection of the function necessary for implementing the required service characteristic, and sets target value of a quantitative metric of the selected function, based on the importance level of each function outputted on the display device in said quantitative metric information output process.

17. The product sales support program of claim 16, further comprising:

service selection processing, which selects a service that either maximizes or minimizes the target value of the quantitative metric of the function necessary for implementing the required service characteristic from a group of services on the subject product, based on the target value of the quantitative metric of the function set by said quantitative metric target setting process.

18. The product sales support program of any of claim 13 through 16 and claim 17, wherein said required service characteristic information collection process prompts selection of one of two pieces of the required service characteristic information, so as to input the user evaluation information regarding each piece of required service characteristic information.

* * * * *